US011561970B2

(12) United States Patent
Kojima et al.

(10) Patent No.: US 11,561,970 B2
(45) Date of Patent: Jan. 24, 2023

(54) TECHNIQUES FOR ACCURATELY SPECIFYING IDENTIFICATION INFORMATION

(71) Applicant: NEC Corporation, Tokyo (JP)

(72) Inventors: Kazufumi Kojima, Tokyo (JP); Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 123 days.

(21) Appl. No.: 16/972,031

(22) PCT Filed: Jun. 5, 2018

(86) PCT No.: PCT/JP2018/021567
§ 371 (c)(1),
(2) Date: Dec. 4, 2020

(87) PCT Pub. No.: WO2019/234827
PCT Pub. Date: Dec. 12, 2019

(65) Prior Publication Data
US 2021/0240701 A1    Aug. 5, 2021

(51) Int. Cl.
*G06F 16/245* (2019.01)
*G06F 16/22* (2019.01)

(52) U.S. Cl.
CPC ........ *G06F 16/245* (2019.01); *G06F 16/2272* (2019.01)

(58) Field of Classification Search
CPC .. G06F 16/215; G06F 16/245; G06F 16/2272; G06F 16/282; G06F 16/906;
(Continued)

(56) References Cited

U.S. PATENT DOCUMENTS

| | | | |
|---|---|---|---|
| 7,403,942 B1 * | 7/2008 | Bayliss | G06F 16/215 |
| | | | 707/999.005 |
| 2008/0208735 A1 * | 8/2008 | Balet | G06F 16/288 |
| | | | 705/39 |

(Continued)

FOREIGN PATENT DOCUMENTS

| | | | | |
|---|---|---|---|---|
| CN | 106034149 A | * | 10/2016 | ......... G06F 16/9535 |
| CN | 104573057 B | * | 10/2017 | ......... G06F 16/9535 |

(Continued)

OTHER PUBLICATIONS

International Search Report corresponding to PCT/JP2018/021567, 2 pages, dated Aug. 21, 2018.

(Continued)

*Primary Examiner* — James E Richardson

(57) ABSTRACT

An information processing apparatus capable of accurately specifying identification information whose users are the same user regardless of information registered by users is provided. The information processing apparatus may include at least one memory storing instructions and at least one processor configured to execute the instructions to: acquire positional information associated with at least one piece of related identification information related to each of a plurality of pieces of identification information for identifying users in a communication service; specify hierarchized positional information indicating positional information hierarchized in accordance with a granularity level of a position based on the positional information; calculate a similarity between pieces of identification information using the hierarchized positional information; and specify the pieces of identification information belonging to the same user from among the plurality of pieces of identification information based on the calculated similarity.

15 Claims, 16 Drawing Sheets

(58) Field of Classification Search
CPC ...... G06Q 30/02; G06Q 50/01; H04L 51/222;
H04L 51/52; H04L 67/12; H04L 67/306;
H04L 67/52; H04L 67/535; H04W 4/21
See application file for complete search history.

(56) References Cited

U.S. PATENT DOCUMENTS

| | | | | |
|---|---|---|---|---|
| 2010/0111372 | A1* | 5/2010 | Zheng | G06Q 30/0205 340/8.1 |
| 2010/0153292 | A1* | 6/2010 | Zheng | G06Q 30/02 705/347 |
| 2013/0346422 | A1* | 12/2013 | Jordahl | G06F 16/24578 707/769 |
| 2014/0122705 | A1* | 5/2014 | Bao | H04L 67/535 709/224 |
| 2015/0032770 | A1 | 1/2015 | Lei et al. | |
| 2021/0065046 | A1* | 3/2021 | Lu | G06N 20/00 |

FOREIGN PATENT DOCUMENTS

| | | |
|---|---|---|
| JP | 2012-500427 A | 1/2012 |
| JP | 2013-122630 A | 6/2013 |
| WO | WO-2010/019801 A1 | 2/2010 |
| WO | WO-2019041525 A1 * | 3/2019 ............ G06F 16/35 |

OTHER PUBLICATIONS

X. Han, L. Wang, et al., "Linking Social Network Accounts by Modeling User Spatiotemporal Habits", IEEE International Conference on Intelligence and Security Informatics (ISI), 2017, pp. 19-24.

X. Han, L. Wang, et al., "Social Media Account Linkage Using User-Generated Geo-location Data," IEEE International Conference on Intelligence and Security Informatics (ISI), Sep. 2016, pp. 157-162.

* cited by examiner

HIERARCHIZED POSITIONAL INFORMATION TABLE T1

| RELATED ACCOUNT | 1 | 2 | ... | M-1 | M |
|---|---|---|---|---|---|
| COUNTRY | JAPAN | JAPAN | ... | JAPAN | JAPAN |
| PREFECTURE | KANAGAWA | | ... | TOKYO | TOKYO |
| CITY/WARD/TOWN/VILLAGE | | | ... | HINO CITY | FUCHU CITY |

Fig. 3

HIERARCHIZED POSITIONAL INFORMATION TABLE T1 (ACCOUNT A)

| RELATED ACCOUNT | A-1 | A-2 | A-3 | A-4 | A-5 | A-6 |
|---|---|---|---|---|---|---|
| COUNTRY | JAPAN | JAPAN | JAPAN | JAPAN | JAPAN | Singapore |
| PREFECTURE | TOKYO | TOKYO | TOKYO | TOKYO | | |
| CITY/WARD/TOWN/VILLAGE | | | FUCHU CITY | | | |

HIERARCHIZED POSITIONAL INFORMATION TABLE T1 (ACCOUNT B)

| RELATED ACCOUNT | B-1 | B-2 | B-3 | B-4 | B-5 | B-6 |
|---|---|---|---|---|---|---|
| COUNTRY | JAPAN | JAPAN | JAPAN | JAPAN | JAPAN | USA |
| PREFECTURE | TOKYO | TOKYO | TOKYO | TOKYO | TOKYO | Pensylvania |
| CITY/WARD/TOWN/VILLAGE | | | | | | Philadelphia |

Fig. 4

| GRANULARITY LEVEL | ELEMENT | ACCOUNT A | ACCOUNT B | SIMILARITY |
|---|---|---|---|---|
| COUNTRY | JAPAN | $\sqrt{5/6}$ | $\sqrt{5/6}$ | 5/6 |
| | Singapore | $\sqrt{1/6}$ | 0 | |
| | USA | 0 | $\sqrt{1/6}$ | |
| PREFECTURE | TOKYO | 1 | $\sqrt{5/6}$ | $\sqrt{5/6}$ |
| | Pennsylvania | 0 | $\sqrt{1/6}$ | |
| CITY/WARD/TOWN/VILLAGE | FUCHU CITY | 1 | 0 | 0 |
| | Philadelphia | 0 | 1 | |

Fig. 5

INTER-DATA-PAIR IMPORTANCE TABLE T2 (ACCOUNT A)

| DATA 1 / DATA 2 | I1 | I2 | I3 | I4 |
|---|---|---|---|---|
| I1 | w(I1, I1, A) | | | |
| I2 | w(I1, I2, A) | w(I2, I2, A) | | |
| I3 | w(I1, I3, A) | w(I2, I3, A) | w(I3, I3, A) | |
| I4 | w(I1, I4, A) | w(I2, I4, A) | w(I3, I4, A) | w(I4, I4, A) |

IMPORTANCE BETWEEN DATA PAIR BY UNIT OF COUNTRY

IMPORTANCE BETWEEN DATA PAIR BY UNIT OF PREFECTURE

IMPORTANCE BETWEEN DATA PAIR BY UNIT OF CITY/WARD/TOWN/VILLAGE

Fig. 11

TECHNIQUES FOR ACCURATELY SPECIFYING IDENTIFICATION INFORMATION

CROSS-REFERENCE TO RELATED APPLICATIONS

This application is a national stage application of International Application No. PCT/JP2018/021567 entitled "INFORMATION PROCESSING APPARATUS, DETERMINATION METHOD, NON-TRANSITORY COMPUTER READABLE MEDIUM STORING PROGRAM, AND INFORMATION PROCESSING SYSTEM," filed on Jun. 5, 2018, the disclosure of which is hereby incorporated by reference in its entirety.

TECHNICAL FIELD

The present disclosure relates to an information processing apparatus, a determination method, a non-transitory computer readable medium storing a program, and an information processing system.

BACKGROUND ART

In recent years, the number of users who use a plurality of Social Networking Services (SNSs) has been increasing. A number of companies have been using SNS information such as profile information and posted information for marketing and a recommendation system. The above SNS information is used also for criminal investigations and the like conducted by law enforcement agencies.

In particular, by determining whether or not users having identification information (e.g., account) for identifying users in a plurality of SNSs are the same user, integrating the results of the determination, and using the integrated results, the amount of information for estimating attributes of users such as sex and age increases. When the amount of information for estimating attributes of users such as sex and age increases, it can be expected that an accuracy of marketing and results that a recommendation system or the like outputs will be improved. For this reason, research and development of technology for determining whether or not users in an SNS are the same user using SNS information has been advancing.

With regard to the above technique, Patent Literature 1 discloses calculating a matching degree of information between pieces of identification information using profile information of each of a plurality of pieces of identification information (e.g., accounts). Patent Literature 1 further discloses a technique for determining whether or not users who have identification information are the same user based on the calculated matching degree.

Further, Non-Patent Literature 1 discloses calculating a matching degree of behavior patterns between pieces of identification information (e.g., accounts) using geolocation posted by a user. Non-Patent Literature 1 further discloses a technique for determining whether or not users who have identification information are the same user based on the calculated matching degree.

CITATION LIST

Patent Literature

[Patent Literature 1] Japanese Unexamined Patent Application Publication No. 2013-122630

Non-Patent Literature

[Non-Patent Literature 1] X. Han, X Liang and et al. "Linking social network accounts by modeling user spatiotemporal habits", Intelligence and Security Informatics (ISI), IEEE International Conference on, 2017

SUMMARY OF INVENTION

Technical Problem

In the techniques disclosed in Patent Literature 1 and Non-Patent Literature 1, a matching degree of information between pieces of identification information is calculated using information associated with the identification information to be determined. Therefore, when, for example, information associated with the identification information to be determined is erroneous or a false content is registered or posted, it is impossible to accurately calculate a matching degree of information between pieces of identification information. That is, even when the techniques disclosed in Patent Literature 1 and Non-Patent Literature 1 are used, it is possible that identification information belonging to one person may not be accurately specified.

The present disclosure has been made in order to solve the aforementioned problem and one object of the present disclosure is to provide an information processing apparatus, a determination method, and a non-transitory computer readable medium storing a program capable of accurately specifying identification information whose users are the same user regardless of information registered by users.

Solution to Problem

An information processing apparatus according to the present disclosure includes: positional information acquisition means for acquiring positional information associated with at least one piece of related identification information related to each of a plurality of pieces of identification information to be determined, each of the pieces of identification information identifying users in a communication service; positional information processing means for specifying hierarchized positional information indicating positional information hierarchized in accordance with a granularity level of a position based on the positional information; calculation means for calculating a similarity between pieces of identification information using the hierarchized positional information; and specifying means for specifying pieces of identification information belonging to one user from among the plurality of pieces of identification information based on the similarity that has been calculated.

Further, a determination method according to the present disclosure is a determination method including: acquiring positional information associated with at least one piece of related identification information related to each of a plurality of pieces of identification information to be determined, each of the pieces of identification information identifying users in a communication service; specifying hierarchized positional information indicating positional information hierarchized in accordance with a granularity level of a position based on the positional information; calculating a similarity between pieces of identification information using the hierarchized positional information; and specifying pieces of identification information belonging to one user from among the plurality of pieces of identification information based on the similarity that has been calculated.

Further, a non-transitory computer readable medium according to the present disclosure is a non-transitory computer readable medium storing a program for causing a computer to execute the following processing of: acquiring positional information associated with at least one piece of related identification information related to each of a plurality of pieces of identification information to be determined, each of the pieces of identification information identifying users in a communication service; specifying hierarchized positional information indicating positional information hierarchized in accordance with a granularity level of a position based on the positional information; calculating a similarity between pieces of identification information using the hierarchized positional information; and specifying pieces of identification information belonging to one user from among the plurality of pieces of identification information based on the similarity that has been calculated.

Further, an information processing system according to the present disclosure is an information processing system including: a server configured to provide a communication service; and an information processing apparatus configured to perform communication with the server, in which the information processing apparatus includes: positional information acquisition means for acquiring positional information associated with at least one piece of related identification information related to each of a plurality of pieces of identification information to be determined, each of the pieces of identification information identifying users in the communication service; positional information processing means for specifying hierarchized positional information indicating positional information hierarchized in accordance with a granularity level of a position based on the positional information; calculation means for calculating a similarity between pieces of identification information using the hierarchized positional information; and specifying means for specifying pieces of identification information belonging to one user from among the plurality of pieces of identification information based on the similarity that has been calculated.

Advantageous Effects of Invention

According to the present disclosure, it is possible to provide an information processing apparatus, a determination method, a non-transitory computer readable medium storing a program, and an information processing system capable of accurately specifying identification information whose users are the same user regardless of information registered by users.

BRIEF DESCRIPTION OF DRAWINGS

FIG. 3 is a diagram for describing a hierarchized positional information table according to the first example embodiment;
FIG. 4 is a diagram for describing processing for calculating a similarity between accounts;
FIG. 5 is a diagram for describing processing for calculating the similarity between accounts;
FIG. 11 is a diagram for describing an inter-data-pair importance table.

DESCRIPTION OF EMBODIMENTS

Overview of Example Embodiments

Prior to giving the description of example embodiments of the present disclosure, an overview of example embodiments will be described.

Figure 1:
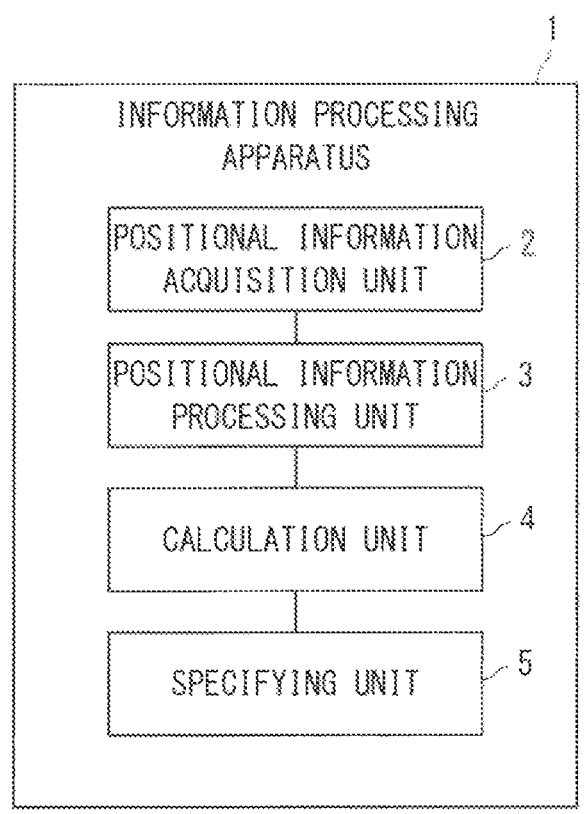
FIG. 1 is a diagram showing an overview of an information processing apparatus according to example embodiments of the present disclosure.

First, with reference to FIG. 1, an overview of an information processing apparatus 1 according to the example embodiments of the present disclosure will be described. FIG. 1 is a diagram showing an overview of an information processing apparatus according to example embodiments of the present disclosure.

The information processing apparatus 1 may be a computer apparatus that is operated by a processor executing a program stored in a memory. The information processing apparatus 1 may be a server apparatus, a personal computer apparatus or the like. The information processing apparatus 1 may be an SNS server. The information processing apparatus 1 includes a positional information acquisition unit 2, a positional information processing unit 3, a calculation unit 4, and a specifying unit 5. The positional information acquisition unit 2, the positional information processing unit 3, the calculation unit 4, and the specifying unit 5 respectively function as positional information acquisition means, positional information processing means, calculation means, and specifying means.

The positional information acquisition unit 2 acquires positional information associated with at least one piece of related identification information that relates to each of a plurality of pieces of identification information to be determined, the plurality of pieces of identification information being identification information for identifying users in a communication service. The communication service may be an SNS, a communication service or the like. Further, the identification information and the related identification information may be accounts, telephone numbers or the like. The account may be information that includes at least one of an Identifier (ID), a user name, and a password. In the following description of the example embodiments, a communication service will be described as an SNS and the identification information and the related identification information will be described as accounts.

The positional information processing unit 3 specifies hierarchized positional information indicating positional information hierarchized in accordance with a granularity level of a position based on the positional information acquired by the positional information acquisition unit 2. The granularity level of the position may be formed by a plurality of granularity levels. The plurality of granularity levels may be levels that correspond to units of countries or units of administrative districts.

The calculation unit 4 calculates a similarity between pieces of identification information using the hierarchized positional information specified by the positional information processing unit 3.

The specifying unit 5 specifies pieces of identification information belonging to one user from among the plurality of pieces of identification information based on the similarity between the pieces of identification information calculated by the calculation unit 4.

As described above, the information processing apparatus 1 according to the example embodiments acquires positional information associated with related identification information related to the plurality of pieces of identification information to be determined and specifies the hierarchized positional information based on the acquired positional information. Then the information processing apparatus 1 calculates the similarity between the pieces of identification information using the hierarchized positional information and specifies pieces of identification information belonging to one user from among the plurality of pieces of identification information based on the calculated similarity. That is, the information processing apparatus 1 according to the example embodiments specifies the pieces of identification information belonging to the same user using the positional information associated with related identification information related to the identification information to be determined without using information associated with the plurality of pieces of identification information to be determined. Therefore, with the information processing apparatus 1 according to the example embodiments, even when the information associated with the identification information to be determined is erroneous or when a user has registered false information, it is possible to specify the pieces of identification information belonging to the same user. Therefore, with the information processing apparatus 1 according to the example embodiments, it becomes possible to accurately specify that users are the same user regardless of information registered by users.

Hereinafter, with reference to the drawings, the example embodiments will be described. In the example embodiments, the same elements are denoted by the same reference symbols and overlapping descriptions will be omitted.

First Example Embodiment

Hereinafter, with reference to the drawings, details of the example embodiments will be described.
<Configuration Example of Information Processing System>

First, with reference to FIG. 2, a configuration example of an information processing system 100 will be described.

Figure 2:
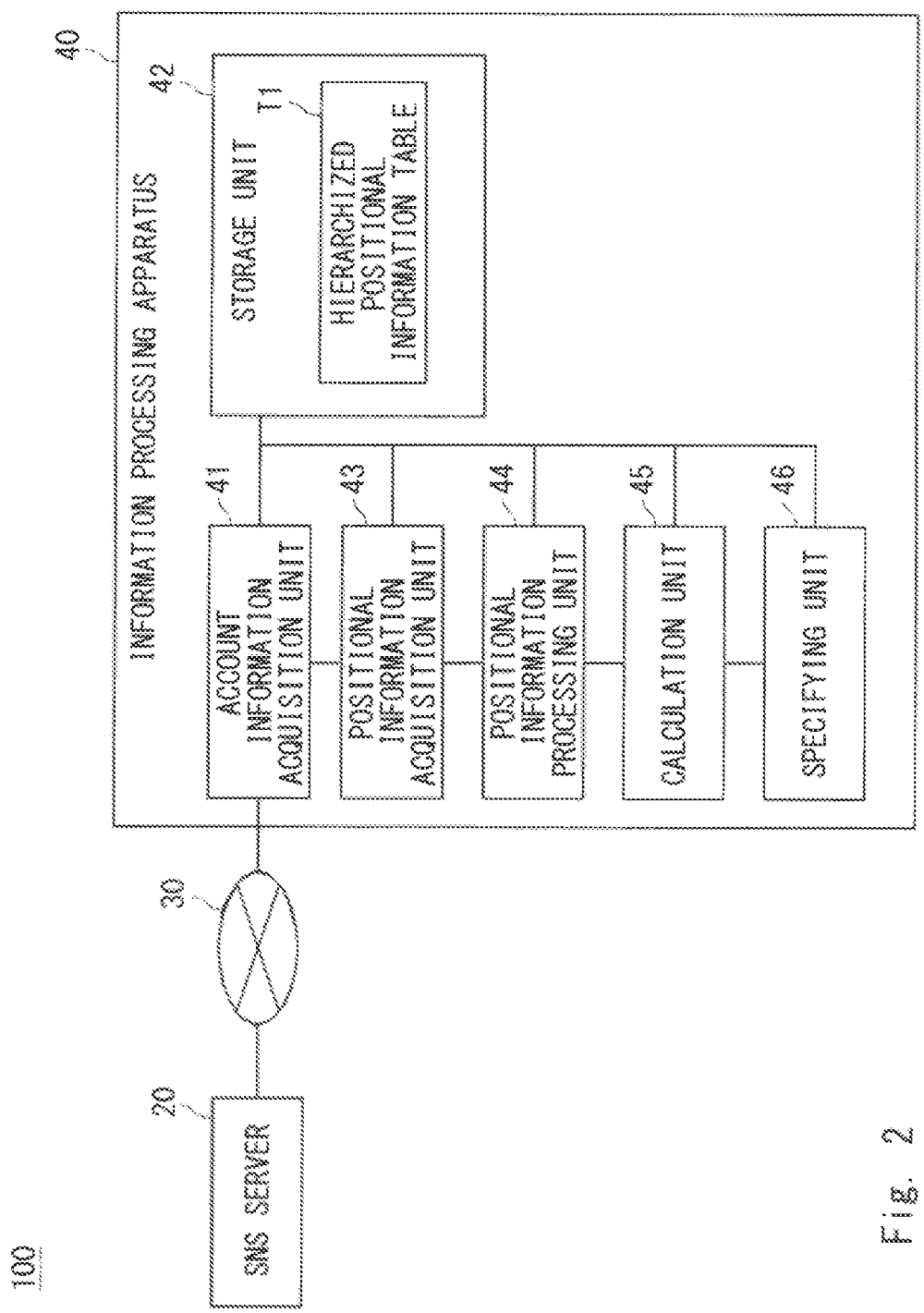
FIG. 2 is a diagram showing a configuration example of an information processing system according to the first example embodiment.

FIG. 2 is a diagram showing a configuration example of an information processing system according to a first example embodiment. The information processing system 100 includes an SNS server 20, a network 30, and an information processing apparatus 40. While the information processing system 100 is configured to include one SNS server in FIG. 2, it may include a plurality of SNS servers.

The SNS server 20 is a server for providing an SNS for a plurality of users who subscribe to this SNS. The SNS corresponds to the communication service in the overview of the example embodiments. The SNS server 20 stores IDs, user names, passwords, and profile information registered by the plurality of users who subscribe to the SNS. The SNS server 20 further stores posted information posted by the plurality of users who subscribe to the SNS. In the following description, information including at least one of an ID, a user name, and a password is referred to an account. The account corresponds to the identification information of the user in the overview of the example embodiments. Further, the information including the ID, the user name, the password, the profile information, and the posted information is referred to account information in the following description. That is, the SNS server 20 stores account information of the plurality of users who subscribe to the SNS.

Further, the SNS server 20 manages user relation information indicating a relation between users in the SNS provided by the SNS server 20. The user relation information may be information regarding the account having a friendship such as "friend", "follow", and "follower" of each account. The user relation information may include information regarding the account including posted information that is related to the posted information of each account. The user relation information may include information regarding an account that includes posted information, which is a citation of the posted information of each account, that is, posted information that has been so-called "retweeted", and an account having a history of giving "Like" or the like to the posted information of each account. The user relation information may include information regarding the account having a history of viewing the account information including the profile of each account and the posted information. That is, the user relation information may include information regarding the account that has left a so-called "footprint".

The information processing apparatus 40 corresponds to the information processing apparatus 1 in the overview of the example embodiments. The information processing apparatus 40 may be a server apparatus, a personal computer apparatus or the like. The information processing apparatus 40 connects to and communicates with the SNS server 20 via the network 30.

<Configuration Example of Information Processing Apparatus>

Next, a configuration example of the information processing apparatus 40 will be described. The information processing apparatus 40 includes an account information acquisition unit 41, a storage unit 42, a positional information acquisition unit 43, a positional information processing unit 44, a calculation unit 45, and a specifying unit 46. The account information acquisition unit 41, the storage unit 42, the positional information acquisition unit 43, the positional information processing unit 44, the calculation unit 45, and the specifying unit 46 respectively function as account information acquisition means, storage means, positional information acquisition means, positional information processing means, calculation means, and specifying means. Further, as described above, since the account corresponds to the identification information of the user in the overview of the example embodiments, the account information acquisition unit 41 can also be called identification information acquisition means.

The account information acquisition unit 41 acquires a plurality of accounts to be determined, account information of each account, a related account related to each account, and the related account information associated with the related account from the SNS server 20. Upon acquiring the account information and the related account information, the account information acquisition unit 41 stores them in the storage unit 42 in association with each other.

The account information acquisition unit 41 specifies, by using, for example, a social graph, which is a graph indicating the connection between users, the related account related to each account, and acquires the specified related account and the related account information of the related account. The related account corresponds to the related identification information in the overview of the example embodiments. The related account information may be information including the ID, the user name, the password, the profile information, and the posted information.

The related account may be, for example, an account having a friendship in the SNS such as "friend", "follower", and "follow" in the SNS. Further, the related account may include an account that has responded to the posted information of each account. Further, the related account may include an account having a history of viewing the account information including the profile of each account and the posted information, which is the account that has left a so-called "footprint".

The account that has responded to the posted information of each account may be an account having a history of viewing the posted information of each account or may be an account that has posted a comment with regard to the posted information of each account. Further, the account that has responded to the posted information of each account may be an account that has posted information, which is a citation of the posted information of each account, that is, an account that has "retweeted" or may be an account that has shown a reaction such as "Like" with regard to the posted information of each account.

The storage unit 42 stores the account information and the related account information that have been acquired by the account information acquisition unit 41 in association with each other. Further, the storage unit 42 stores the hierarchized positional information table T1 specified by the positional information processing unit 44 described later.

The positional information acquisition unit 43 acquires the positional information associated with the related account from the related account information stored in the storage unit 42. The positional information acquisition unit 43 may acquire positional information from the place of residence, the hometown or the like in the profile information included in the related account information. Alternatively, the positional information acquisition unit 43 may acquire, of the posted information included in the related account information, the positional information from words by which the position can be specified. Alternatively, when the information called a GEO tag from which the current location of the poster can be specified has been given to the posted information included in the related account information, the positional information acquisition unit 43 may acquire the positional information from the GEO tag. Alternatively, the positional information acquisition unit 43 may acquire the positional information using geolocation. When one of the posted information and the geolocation is used, the positional information acquisition unit 43 may use the positional information that has been acquired the most among the acquired positional information. The positional information acquisition unit 43 outputs the acquired positional information to the positional information processing unit 44.

The positional information processing unit 44 specifies the hierarchized positional information indicating the positional information hierarchized in accordance with the granularity levels of a plurality of predetermined positions based on the positional information acquired by the positional information acquisition unit 43. Then the positional information processing unit 44 generates the hierarchized positional information table T1 in which the hierarchized positional information for each related account information is set. The positional information processing unit 44 stores the hierarchized positional information table T1 that has been generated in the storage unit 42 and outputs the hierarchized positional information table T1 to the calculation unit 45 that will be described later.

The granularity levels may be, for example, levels that correspond to units of countries or units of administrative districts. When, for example, three levels are defined as the granularity levels, the lowest granularity level may be a level by units of countries, the second lowest granularity level may be a level by units of prefectures, and the third lowest granularity level may be a level by units of cities/wards/towns/villages. While the following description will be given assuming that there are three granularity levels as described above, this is merely one example and the present disclosure is not limited to this example.

The positional information processing unit 44 specifies which granularity level the positional information acquired by the positional information acquisition unit 43 corresponds to, and specifies positional information by units of "countries", positional information by units of "prefectures", and positional information by units of "cities/wards/towns/villages" based on the acquired positional information. It is assumed, for example, that the SNS has prepared a place of residence or a hometown of a user included in the profile information as a format of registering information of "country", "prefecture", and "city/ward/town/village". In this case, the positional information processing unit 44 acquires the information of "country", "prefecture", and "city/ward/town/village" in accordance with the above format, thereby specifying the hierarchized positional information of each granularity level.

Assume that the SNS does not prepare the above format and allows users to register desired positional information as their places of residence or hometowns. In this case, the positional information processing unit 44 automatically searches the Internet and acquires a correspondence table by units of "countries", "prefectures", and "cities/wards/towns/villages". Then the positional information processing unit 44 specifies the hierarchized positional information of each granularity level based on the positional information acquired by the positional information acquisition unit 43 and the correspondence table. The correspondence table may be, for example, a table indicating which "country", which "prefecture", and which "city/ward/town/village" the name of the place or the name of an area belongs to. Further, even in a case in which the format that the SNS has prepared is different from a predetermined granularity level, the positional information processing unit 44 specifies the hierarchized positional information of each granularity level using the above correspondence table. The positional information processing unit 44 may specify the hierarchized positional information of each granularity level using, for example, a correspondence table that the administrator or the operator of the information processing apparatus 40 has prepared and registered in advance without acquiring the above correspondence table by searching the Internet.

Now, the positional information with a high granularity level (classified with fine granularity) is contained in the positional information with a low granularity level (classified with coarse granularity). Therefore, the positional information processing unit 44 is able to specify the positional information having a low granularity level using the above correspondence table when the granularity level of the positional information acquired by the positional information acquisition unit 43 is high. Specifically, when the positional information acquired by the positional information acquisition unit 43 is "Fuchu city", the positional information processing unit 44 specifies that the acquired positional information is the one whose granularity level is the unit of "cities/wards/towns/villages". Since the granularity levels lower than the unit of "cities/wards/towns/villages" are the unit of "countries" and the unit of "prefectures", the positional information processing unit 44 specifies the hierarchized positional information by units of "prefectures" as "Tokyo" and specifies the hierarchized positional information by units of "countries" as "Japan" based on the acquired positional information.

Since it is impossible to specifically specify the positional information with a high granularity level (classified with fine granularity) from the positional information with a low granularity level (classified with coarse granularity), the positional information processing unit 44 does not specify hierarchized positional information with a high granularity level in this example embodiment.

When, for example, the positional information by units of "prefectures" has been acquired, the positional information processing unit 44 may specify this positional information as the positional information by units of "cities/wards/towns/villages" based on the location where a government building that corresponds to the acquired positional information is present. When, for example, the positional information acquisition unit 43 has acquired "Tokyo" as the positional information by units of "prefectures", the positional information processing unit 44 may determine the location where a government building of "Tokyo" exists as hierarchized positional information by units of "cities/wards/towns/villages" having a high granularity level (classified with fine granularity). Alternatively, when, for example, the positional information by units of "prefectures" has been acquired, the positional information processing unit 44 may determine the most populous position among the acquired positional information as the hierarchized positional information with a high granularity level. When, for example, the positional information by units of "prefectures" has been acquired, the positional information processing unit 44 may determine the position where a representative station is present among the acquired positional information as the hierarchized positional information with a high granularity level.

Referring now to FIG. 3, the hierarchized positional information table T1 generated by the positional information processing unit 44 will be described. FIG. 3 is a diagram for describing the hierarchized positional information table according to the first example embodiment. As shown in FIG. 3, the hierarchized positional information table T1 is a table that is generated for each account and manages the hierarchized positional information for each of related accounts. In the hierarchized positional information table T1, the related account, the hierarchized positional information by units of "countries", the hierarchized positional information by units of "prefectures", and the hierarchized positional information by units of "cities/wards/towns/villages" are set.

As the related account, the related account related to each account is set. FIG. 3 is a diagram taking a case in which the total number of related accounts is M (M: a natural number equal to or larger than 1) as an example, and the respective related accounts are set in order from the left. While the respective related accounts are indicated by numerals for the sake of convenience of the description in FIG. 3, information including at least one of the ID and the user name may be set in the related account.

The hierarchized positional information whose granularity level is the unit of "countries" specified by the positional information processing unit 44 is set as the hierarchized positional information by units of "countries".

The hierarchized positional information whose granularity level is the unit of "prefectures" specified by the positional information processing unit 44 is set as the hierarchized positional information by units of "prefectures".

The hierarchized positional information whose granularity level is the unit of "cities/wards/towns/villages" specified by the positional information processing unit 44 is set as the hierarchized positional information by units of "cities/wards/towns/villages".

As described above, when the hierarchized positional information by units of "countries", "prefectures", and "cities/wards/towns/villages" can be specified from the positional information acquired by the positional information acquisition unit 43, the positional information processing unit 44 sets all the pieces of hierarchized positional information, like the related accounts M-1 and M shown in FIG. 3. Further, when one of the pieces of hierarchized positional information of the units of "countries", "prefectures", and "cities/wards/towns/villages" cannot be specified from the positional information acquired by the positional information acquisition unit 43, the positional information processing unit 44 sets only the specified hierarchized positional information, as shown in the related accounts 1 and 2 shown in FIG. 3. Then the positional information processing unit 44 does not set the hierarchized positional information that cannot be specified in the hierarchized positional information table T1, as shown in the oblique lines in FIG. 3.

Referring is made once again to FIG. 2, and the calculation unit 45 will be described. The calculation unit 45 corresponds to the calculation unit 4 in the overview of the example embodiments. The calculation unit 45 receives the hierarchized positional information table T1 that has been generated by the positional information processing unit 44 and calculates the similarity between accounts using the hierarchized positional information.

Specifically, the calculation unit 45 counts, in each account, for each granularity level, the number for each data included in the hierarchized positional information associated with the granularity level, and calculates a value obtained by normalizing the number for each data that has been counted by the number of related identifications. The calculation unit 45 calculates, for each piece of data that is common to two accounts based on which the similarities for the respective granularity levels between accounts are calculated, a value obtained by multiplying the normalized values in these two accounts as the evaluation value of each of the pieces of data. The calculation unit 45 calculates the total sum of the evaluation values of all the pieces of data that are common to the two accounts as the similarities for the respective granularity levels between the two accounts. Than the calculation unit 45 calculates the total sum of the similarities for all the respective granularity levels as the similarity between two accounts.

Now, with reference to FIGS. 4 and 5, processing for calculating the similarity between accounts performed by the calculation unit 45 will be described. FIGS. 4 and 5 are diagrams for describing processing for calculating the similarity between accounts.

First, with reference to FIG. 4, a case in which the calculation unit 45 calculates the similarity between an account A and an account B will be described. While a case in which the similarity between the account A and the account B is calculated is shown in FIG. 4, the calculation unit 45 calculates the similarity between accounts for all the account pairs.

The upper diagram shown in FIG. 4 shows the hierarchized positional information table T1 of the account A to be determined. Specifically, the upper diagram shown in FIG. 4 shows the hierarchized positional information of related accounts A-1 to A-6 of the account A. The lower diagram in FIG. 4 shows the hierarchized positional information table T1 of the account B to be determined. Specifically, FIG. 4 shows the hierarchized positional information of related accounts B-1 to B-6 of the account B.

The calculation unit 45 determines a sum set of the data included in the hierarchized positional information for each granularity level. In other words, the calculation unit 45 extracts data included in the hierarchized positional information associated with one of the account A and the account B based on which the similarity between accounts is calculated. With reference to the upper diagram and the lower diagram of FIG. 4, since the hierarchized positional information whose granularity level is "country" includes "Japan", "Singapore", and "USA", the calculation unit 45 extracts the data "Japan", "Singapore", and "USA" as the sum set. Likewise, since the hierarchized positional information whose granularity level is "prefecture" includes "Tokyo" and "Pennsylvania", the calculation unit 45 extracts the data "Tokyo" and "Pennsylvania" as the sum set. Likewise, since the hierarchized positional information whose granularity level is "city/ward/town/village" includes "Fuchu city" and "Philadelphia", the calculation unit 45 extracts the data "Fuchu city" and "Philadelphia". While the information such as "Japan" included in the hierarchized positional information is described as data, it can also be said that it is an information element or an element that forms the hierarchized positional information.

After the calculation unit 45 extracts the data included in the hierarchized positional information of each granularity level, the calculation unit 45 counts, for each of the pieces of data that have been extracted, the number of related accounts that include this data. At this time, when one of the pieces of data is not present in the counted account, the number of pieces of data is set to be 0.

As shown in FIG. 4, regarding the account A, when the granularity level is "country", the number of counts of "Japan" is 5, the number of counts of "Singapore" is 1, and the number of counts of "USA" is 0. When the granularity level is "prefecture", the number of counts of "Tokyo" is 4 and the number of counts of "Pennsylvania" is 0. Further, when the granularity level is "city/ward/town/village", the number of counts of "Fuchu city" is 1 and the number of counts of "Philadelphia" is 0.

As shown in FIG. 4, regarding the account B, when the granularity level is "country", the number of counts of "Japan" is 5, the number of counts of "Singapore" is 0 and the number of counts of "USA" is 1. When the granularity level is "prefecture", the number of counts of "Tokyo" is 5 and the number of counts of "Pennsylvania" is 1. Further, when the granularity level is "city/ward/town/village", the number of counts of "Fuchu city" is 0 and the number of counts of "Philadelphia" is 1.

Next, the calculation unit 45 performs normalization by the number of related accounts for each granularity level in such a way that a square sum of the number of counts of each data becomes 1 and calculates the similarity for each granularity level. Specifically, as shown in FIG. 5, the calculation unit 45 calculates, for each granularity level, the value obtained by normalizing the number of counts for each data piece by the number of related accounts. The calculation unit 45 sets, for each of the pieces of data, a value obtained by multiplying the normalized value in the account A by the normalized value in the account B as the evaluation value for this data. The calculation unit 45 calculates a value obtained by adding the evaluation values of the respective pieces of data for all the pieces of data as the similarity for each granularity level.

The above contents are expressed by a calculation formula as follows. When the granularity level is "country", the similarity for each granularity level is calculated as follows.

$$\sqrt{5/6} \times \sqrt{5/6}(\text{Japan}) + \sqrt{1/6} \times 0(\text{Singapore}) + 0 \times \sqrt{1/6}(\text{USA}) = 5/6$$

Further, when the granularity level is "prefecture", the similarity for each granularity level is calculated as follows.

$$1 \times \sqrt{5/6}(\text{Tokyo}) + 0 \times \sqrt{1/6}(\text{Pennsylvania}) = 5/6$$

Further, when the granularity level is "city/ward/town/village", the similarity for each granularity level is calculated as follows.

$$1 \times 0(\text{Fuchu city}) + 0 \times 1(\text{Philadelphia}) = 0$$

After calculating the similarities for the respective granularity levels, the calculation unit 45 calculates the similarity to which a weight in accordance with the granularity level has been applied to the similarity for each granularity level and determines a total sum of the similarities of all the granularity levels as the similarity between the account A and the account B. When predetermined weighting coefficients for the respective granularity levels are denoted by $\alpha$, $\beta$, and $\gamma$ and $\alpha$, $\beta$, and $\gamma$ satisfy the relation $\alpha+\beta+\gamma=1$, the similarity between the account A and the account B can be defined as shown in the following relational expression (1).

$$\text{(Similarity between accounts)} = \alpha \times \text{(similarity of granularity level "country")} + \beta \times \text{(similarity of granularity level "prefecture")} + \gamma \times \text{(similarity of granularity level "city/ward/town/village")} \quad (1)$$

The weighting coefficients $\alpha$, $\beta$, and $\gamma$ may be coefficients that can be arbitrarily set. The weighting coefficients $\alpha$, $\beta$, and $\gamma$ may be coefficients that apply larger weights as the granularity levels become higher, like, for example, $\alpha<\beta<\gamma$. That is, the weight of the similarity of "city/ward/town/village" may be made large and the matching degree of the granularity level "city/ward/town/village" may be emphasized. Alternatively, all the weighting coefficients $\alpha$, $\beta$, and $\gamma$ may be set to 1 and no weight may be applied thereto. Alternatively, the weighting coefficients $\alpha$, $\beta$, and $\gamma$ may be coefficients that apply larger weights as the granularity levels become lower.

Referring again to FIG. 2, the specifying unit 46 will be described. The specifying unit 46 specifies the accounts belonging to one user among the plurality of accounts acquired by the account information acquisition unit 41 based on the similarity between accounts calculated by the calculation unit 45. Specifically, the specifying unit 46 determines, when the similarity between accounts is equal to or larger than a predetermined threshold, that users who own two accounts based on which the similarity between accounts is calculated are the same user. The specifying unit 46 determines whether or not the similarity of all the accounts is equal to or larger than a predetermined threshold and specifies the accounts belonging to one user for the plurality of accounts to be determined.

<Operational Example of Information Processing Apparatus>

Figure 6:
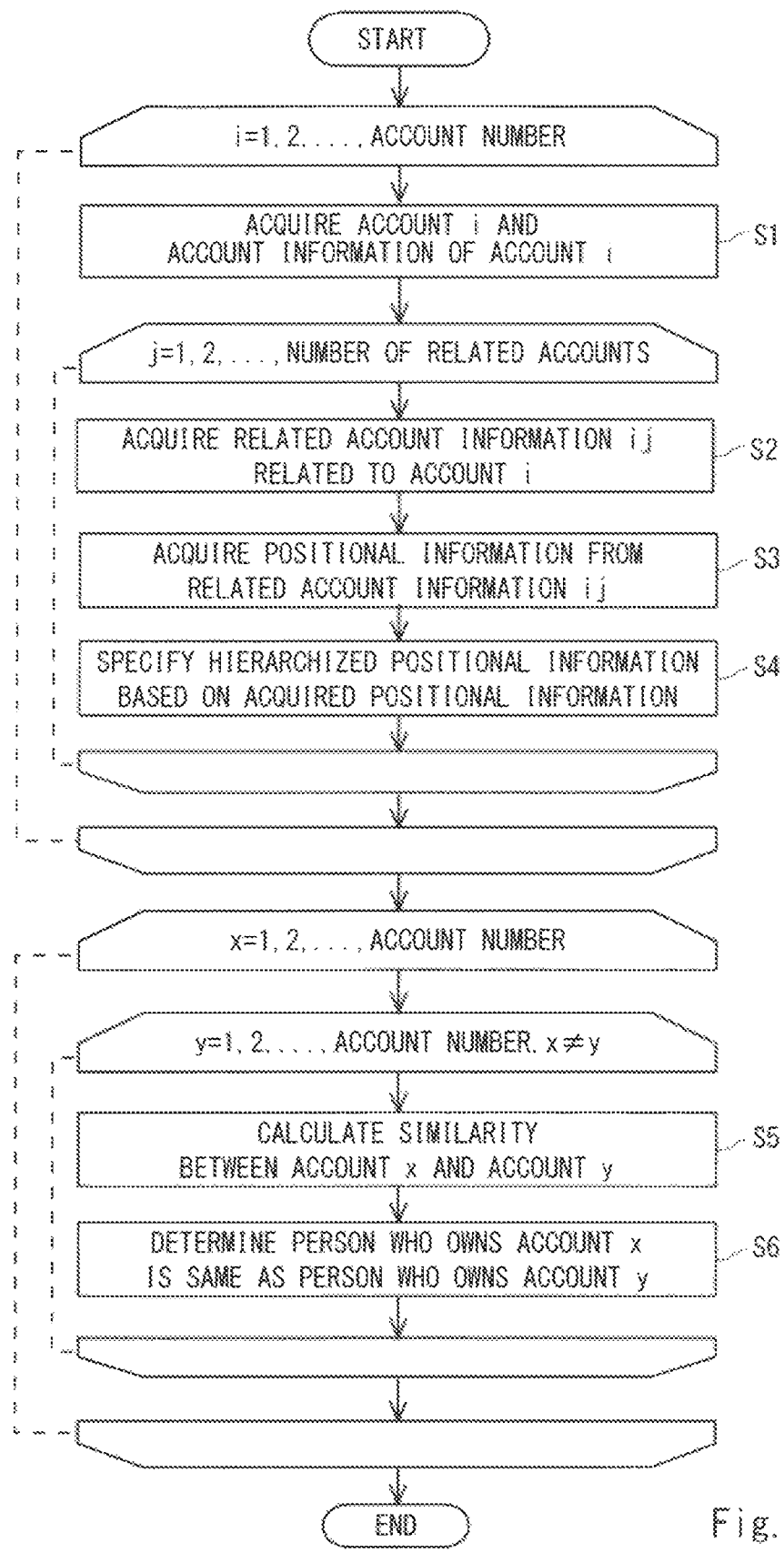
FIG. 6 is a flowchart showing an operational example of an information processing apparatus according to the first example embodiment.

Referring next to FIG. 6, an operational example of the information processing apparatus 40 will be described. FIG. 6 is a flowchart showing an operational example of the information processing apparatus according to the first example embodiment.

As shown in FIG. 6, Steps S1 to S4 are repeated for the number of accounts to be determined. Further, Step S2-S4 are repeated for the number of related accounts.

First, the account information acquisition unit 41 acquires the plurality of accounts to be determined and the account information (Step S1) and acquires related account information related to each account (Step S2). Specifically, the account information acquisition unit 41 connects to and communicates with the SNS server 20 and acquires the plurality of accounts to be determined and the account information. Then the account information acquisition unit 41 acquires the related account related to each account and related account information associated with the related account using, for example, a social graph. Upon acquiring the account information and the related account information, the account information acquisition unit 41 stores them in association with each other in the storage unit 42.

Next, the positional information acquisition unit 43 acquires the positional information from each of the pieces of the related account information (Step S3). Specifically, as described above, the positional information acquisition unit 43 may acquire the positional information from words by which the position included in the posted information can be specified such as the place of residence, the hometown or the like in the profile information included in each of the pieces of the related account information. Alternatively, the positional information acquisition unit 43 may acquire the positional information from the GEO tag of the posted information included in each of the pieces of the related account information. Alternatively, the positional information acquisition unit 43 may acquire the positional information using geolocation. The positional information acquisition unit 43 outputs the acquired positional information to the positional information processing unit 44.

Next, the positional information processing unit 44 specifies hierarchized positional information for each related account based on the positional information acquired by the positional information acquisition unit 43 (Step S4). When the hierarchized positional information by units of "countries", "prefectures", and "cities/wards/towns/villages" can be specified from the positional information acquired by the positional information acquisition unit 43, the positional information processing unit 44 sets all the pieces of hierarchized positional information in the hierarchized positional information table T1. Further, when the hierarchized positional information of any one of the units of "countries", "prefectures", and "cities/wards/towns/villages" cannot be specified from the positional information acquired by the positional information acquisition unit 43, the positional information processing unit 44 sets only the specified hierarchized positional information in the hierarchized positional information table T1.

Next, Steps S5 and S6 are processing executed for each of two accounts (account pair) of the plurality of accounts, and the information processing apparatus 40 executes the processing of Steps S5 and S6 for all the account pairs.

In Step S5, the calculation unit 45 calculates the similarity between the account x (x: 1-account number) and the account y (y: 1-account number, where x≠y) (Step S5). Specifically, the calculation unit 45 extracts, for each granularity level, data included in the hierarchized positional information for each granularity level associated with one of the account x and the account y. The calculation unit 45 counts, for each of the account x and the account y, the number for each of the pieces of extracted data and calculates the value normalized by the number of related accounts. Then the calculation unit 45 determines a total sum of the evaluation values calculated by multiplying the normalized value of the account x by the normalized value of the account y to be the similarity for each granularity level of the account x and the account y. The calculation unit 45 multiplies the similarity for each granularity level by the weighting coefficients $\alpha$, $\beta$, and $\gamma$ corresponding to each granularity level, calculates the total of the calculated value for all the granularity levels and determines the obtained value as the similarity between the account x and the account y.

Next, the specifying unit 46 compares the similarity between the account x and the account y calculated in Step S4 with a predetermined threshold and determines whether or not the user who owns the account x and the user who owns the account y are the same user (Step S6). Specifically, when the similarity between the account x and the account y calculated in Step S4 is equal to or larger than a predetermined threshold, the specifying unit 46 determines that the user who owns the account x and the user who owns the account y are the same user.

As described above, the information processing apparatus 40 according to the first example embodiment specifies the hierarchized positional information based on the positional information associated with the related account and generates the hierarchized positional information table T1. The information processing apparatus 40 calculates the similarity for each granularity level using the hierarchized positional information table T1, multiplies the similarity for each granularity level by the weighting coefficient for each granularity level, calculates the total of the calculated similarity for all the granularity levels, thereby calculating the similarity between accounts. Then the information processing apparatus 40 specifies the accounts belonging to one user of the plurality of accounts based on the similarity between accounts. That is, the information processing apparatus 40 according to this example embodiment specifies the accounts belonging to one user using the related account information without using the account information of the account to be determined. Therefore, according to this example embodiment, even when a false content is included in the account information to be determined or information that is different from the actual information is registered, it is possible to accurately specify the accounts belonging to one user. Therefore, according to this example embodiment, it is possible to accurately specify identification information whose users are the same user regardless of information registered by users.

Second Example Embodiment

Next, a second example embodiment will be described. The second example embodiment is a modified example of the first example embodiment. In the first example embodiment, the similarity between accounts has been calculated using all the pieces of related account information related to each account. In the second example embodiment, the similarity between accounts is calculated using the related account information associated with the related account selected based on the depth of the relationship between related accounts (relevance degree) among all the pieces of related account information related to each account.

When a person has a friendship with, for example, a friend who is acquainted in the real world, it can be assumed that a relationship between accounts is close, like a friendship, also in the SNS. Therefore, in this example embodiment, related accounts with a close relationship in the SNS are specified for each related account, and accounts belonging to one user among a plurality of accounts are specified using the related account information of the related account having a close relationship.

Although the basic configuration of the information processing system according to the second example embodiment is similar to that according to the first example embodiment shown in FIG. 2, the information processing apparatus 40 according to the first example embodiment is replaced by an information processing apparatus 50. Therefore, descriptions regarding the information processing system will be omitted and a configuration example and an operational example regarding the information processing apparatus 50 will be described.

<Configuration Example of Information Processing Apparatus>

Figure 7:
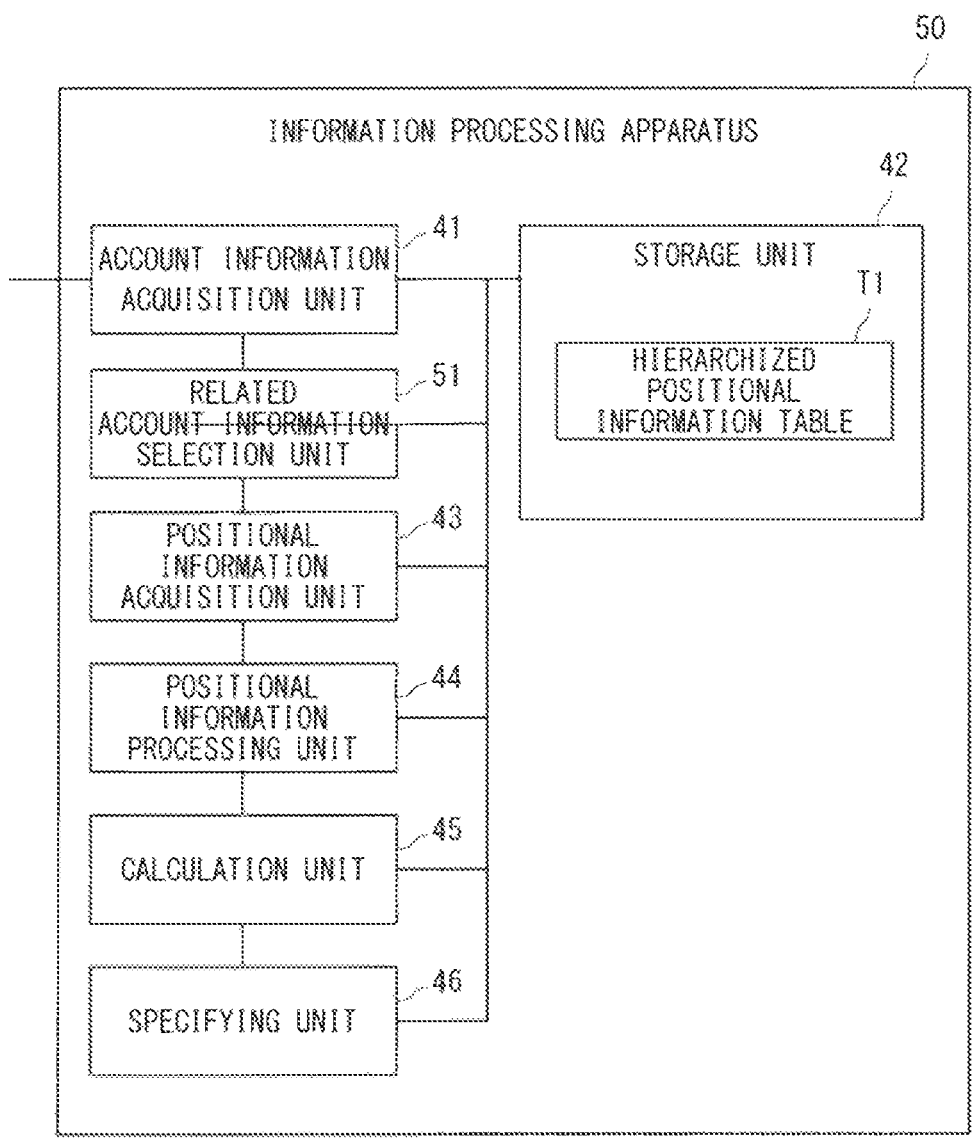
FIG. 7 is a diagram showing a configuration example of an information processing apparatus according to a second example embodiment.

With reference to FIG. 7, a configuration example of an information processing apparatus 50 according to the second example embodiment will be described. FIG. 7 is a diagram showing a configuration example of the information processing apparatus according to the second example embodiment. The information processing apparatus 50 according to the second example embodiment has a configuration in which a related account information selection unit 51 is added to the configuration according to the first example embodiment. Since the other configurations are similar to those of the first example embodiment, the descriptions thereof will be omitted as appropriate and the content that is different from that of the first example embodiment will be described.

The related account information selection unit 51 functions as related account information selection means. Since the related account corresponds to the related identification information in the overview of the example embodiments, it can also be said that the related account information selection unit 51 is related identification information selection means.

The related account information selection unit 51 determines the relevance degree between related accounts acquired by the account information acquisition unit 41 and selects one of the related accounts based on the relevance degree between related accounts that have been determined. In the following description, a set of related accounts may be referred to as a related account group.

Specifically, the related account information selection unit 51 specifies, for each related account group, the related account related to each of the related accounts using, for example, a social graph or the like. The related account information selection unit 51 may specify the account included in "friend", "follower", or "follow" of the related account as a related account (second related account) related to the related account (first related account) in the SNS. Further, the related account information selection unit 51 may specify the account that has responded to the posted information of the related account as the related account related to the related account. Further, the related account information selection unit 51 may specify an account that has viewed the related account information including the profile and the posted information of the related account, which is an account that has left a so-called "footprint", as the account related to the related account.

The account that has responded to the posted information may be an account having a history of viewing the posted information of the related account or an account having a history of describing a comment for the posted information of the related account. Further, the account that has responded to the posted information may be an account that has "retweeted" the posted information of the related account, the account that has checked "Like" or the like for the posted information of the related account.

Upon specifying the related account related to each of the related accounts, the related account information selection unit 51 determines whether the specified related account is included in the related account group acquired by the account information acquisition unit 41. When the specified related account is included in the related account group acquired by the account information acquisition unit 41, the related account information selection unit 51 determines that the relevance degree of the related account and the specified related account is high. The related account information selection unit 51 generates the link information indicating the relationship between related accounts based on the relevance degree between the related accounts.

Figure 8:
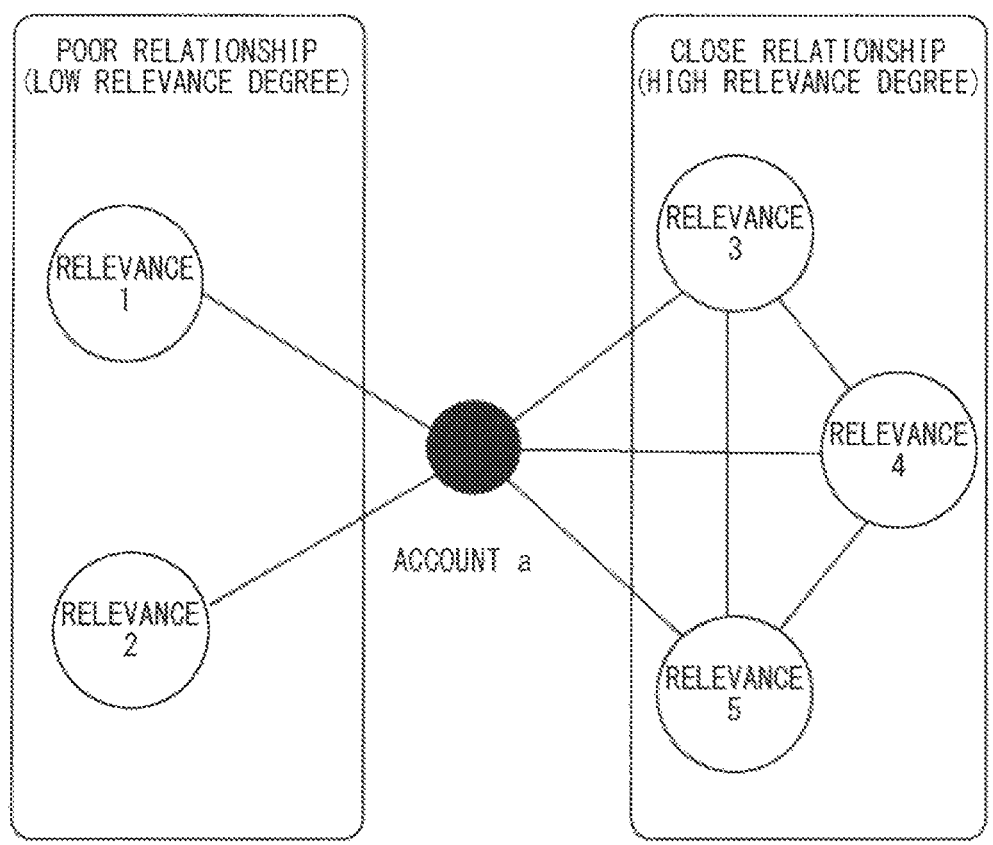
FIG. 8 is a diagram for describing link information indicating a relationship between related accounts.

With reference to FIG. 8, the link information indicating the relationship between related accounts will be described. FIG. 8 is a diagram for describing the link information indicating the relationship between related accounts. As shown in FIG. 8, the related account information selection unit 51 generates link information indicating links between the related accounts having a high relevance degree, centering on each account. The related account information selection unit 51 links the related accounts having a high relevance degree to each other by a solid line and does not link related accounts that are not highly relevant to each other.

As shown in FIG. 8, it is assumed that the number of related accounts of the account a is five and the five related accounts are expressed as nodes whose relevancies are 1-5. If it is assumed that the related account whose relevance is 1 has no relationship with any one of the relevancies 2-5, the related account information selection unit 51 does not cause the relevance 1 to be linked to any one of the relevancies 2-5. Likewise, if it is assumed that the related account whose relevance is 2 has no relationship with any one of the relevancies 1 and 3-5, the related account information selection unit 51 does not cause the relevance 2 to be linked to any one of the relevancies 1 and 3-5.

On the other hand, when it is determined that the related account whose relevance is 3 is highly likely to be related to the relevancies 4 and 5, the related account information selection unit 51 causes the relevance 3 to be linked to the relevancies 4 and 5. Likewise, when it is determined that the related account whose relevance is 4 is highly likely to be related to the relevancies 3 and 5, the related account information selection unit 51 causes the relevance 4 to be linked to the relevancies 3 and 5. Further, when it is determined that the related account whose relevance is 5 is highly likely to be related to the relevancies 3 and 4, the related account information selection unit 51 causes the relevance 5 to be linked to the relevancies 3 and 4.

Upon generating the link information shown in FIG. 8, the related account information selection unit 51 selects related accounts that are linked to each other among the related accounts of the relevancies 1-5 based on the link information. That is, the related account information selection unit 51 selects the related accounts having a high relevance degree from the related account group. Then the related account information selection unit 51 outputs the selected related accounts to the positional information acquisition unit 43.

The positional information acquisition unit 43 acquires the positional information from the related account information of the related accounts selected by the related account information selection unit 51.

<Operational Example of Information Processing Apparatus>

Figure 9A:
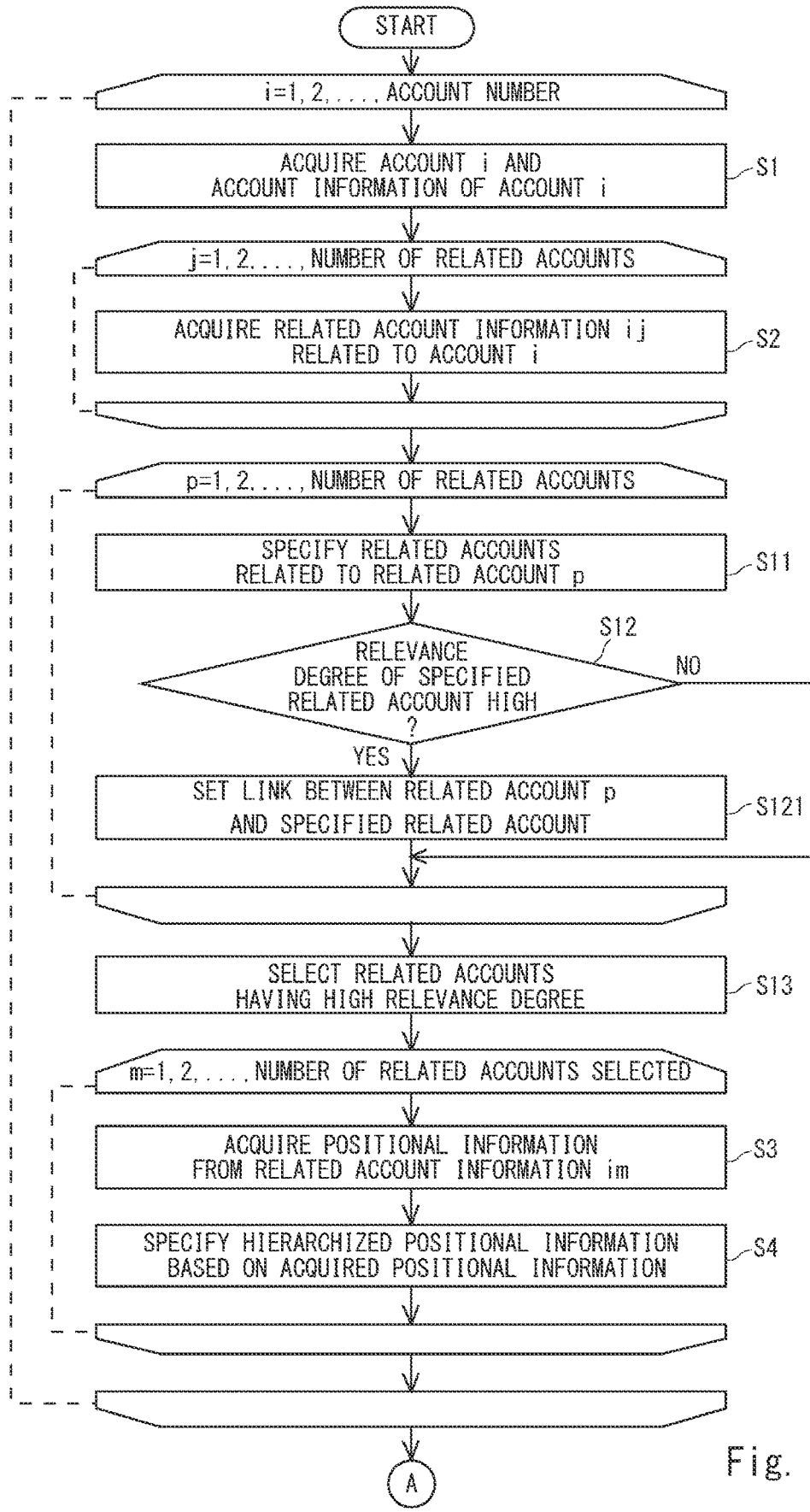
FIG. 9A is a flowchart showing an operational example of the information processing apparatus according to the second example embodiment.
Figure 9B:
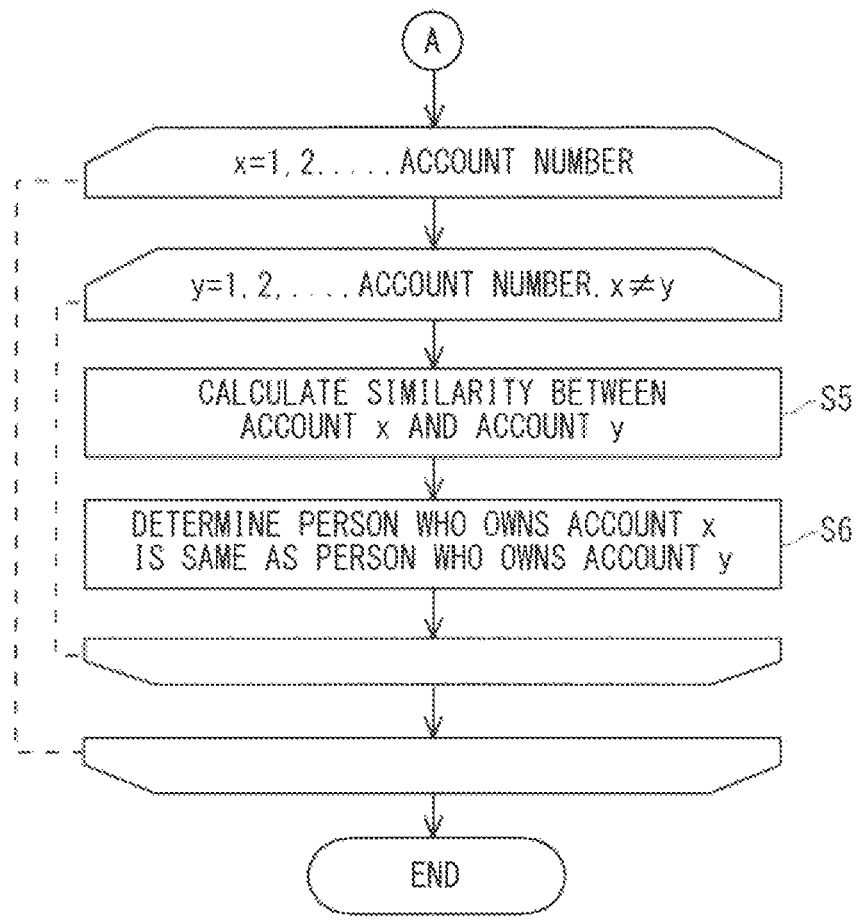
FIG. 9B is a flowchart showing an operational example of the information processing apparatus according to the second example embodiment.

Referring next to FIGS. 9A and 9B, an operational example of the information processing apparatus 50 according to the second example embodiment will be described. FIGS. 9A and 9B are flowcharts showing an operational example of the information processing apparatus according to the second example embodiment. Of the contents of the processing shown in FIGS. 9A and 9B, the contents of the processing that are common to that in FIG. 6 is denoted by the same reference symbols and the descriptions thereof will be omitted as appropriate. When FIGS. 9A and 9B are compared with FIG. 6, the contents of the processing of Steps S11-S13 are added to the contents of the processing shown in FIG. 6.

First, the account information acquisition unit 41 acquires a plurality of accounts to be determined and account information (Step S1).

Next, the account information acquisition unit 41 acquires the related account information for each account (Step S2).

Next, the related account information selection unit 51 specifies the related account for each of the related accounts that have been acquired (Step S11). Specifically, the related account information selection unit 51 specifies the related account related to each of the related accounts using a social graph or the like.

Next, the related account information selection unit 51 determines whether the relevance degree of the related account and the specified related account is high (Step S12). Specifically, the related account information selection unit 51 determines that the relevance degree is high when the related account specified in Step S11 is included in the related accounts acquired in Step S2.

In Step S12, when the related account information selection unit 51 has determined that the relevance degree of the related account and the specified related account is high (YES in Step S12), the related account information selection unit 51 sets a link between the related account and the specified related account in the link information Step S121).

On the other hand, when it is determined in Step S12 that the relevance degree of the related account and the specified related account is not high (NO in Step S12), the related account information selection unit 51 does not set a link between the related account and the specified related account in the link information, and the process returns to Step S11.

Next, the related account information selection unit 51 selects related accounts having a high relevance degree based on the generated link information (Step S13). Specifically, the related account information selection unit 51 determines and selects the related accounts that are linked to each other as the related accounts having a high relevance degree based on the generated link information. The related account information selection unit 51 outputs the selected related accounts to the positional information acquisition unit 43.

Next, the processing of Steps S3 and S4 is repeatedly performed for the number of pieces of related account information that have been selected. The positional information acquisition unit 43 acquires the positional information from each of the pieces of the related account information that have been selected (Step S3) and the positional information processing unit 44 specifies the hierarchized positional information based on the positional information acquired from each of the pieces of the related account information (Step S4).

Next, the information processing apparatus 50 executes the contents of the processing shown in FIG. 9B and specifies accounts belonging to one user from among the plurality of accounts. Since the contents of the processing shown in FIG. 9B are common to the contents of the processing shown in FIG. 6, the detailed descriptions will be omitted.

As described above, the information processing apparatus 50 according to the second example embodiment includes the configuration included in the first example embodiment. Therefore, even when the information processing apparatus 50 according to the second example embodiment is used as well, it becomes possible to accurately specify identification information whose users are the same user regardless of information registered by users, like in the first example embodiment.

Further, the information processing apparatus 50 according to this example embodiment further includes, besides the configuration of the information processing apparatus 40 according to the first example embodiment, the related account information selection unit 51. The related account information selection unit 51 determines the relevance degree between related accounts and selects the related accounts having a high relevance degree. Then the specifying unit 46 specifies accounts belonging to one user based on the similarity between accounts calculated using the hierarchized positional information of the related accounts having a high relevance degree that have been selected. As described above, when a person has a friendship with, for example, a friend who is acquainted in the real world, it can be assumed that a relationship between accounts is close, like a friendship, also in the SNS. Therefore, by using the related account information of the related accounts having a high relevance degree, it becomes possible to calculate the optimal similarity between accounts, whereby it becomes possible to improve the accuracy of specifying accounts belonging to one user. That is, with the information processing apparatus 50 according to this example embodiment, by using the related account information of the related accounts having a high relevance degree information, the accuracy of specifying accounts belonging to one user can be improved. Therefore, according to this example embodiment, compared to the first example embodiment, it is possible to further accurately specify identification information whose users are the same user.

Third Example Embodiment

Next, a third example embodiment will be described. The third example embodiment is a modified example of the first and second example embodiments. Therefore, the third example embodiment will be described with reference to the first example embodiment. In the third example embodiment, the method of calculating the similarity between accounts is different from those of the first and second example embodiments.

The third example embodiment is different from the first example embodiment in that an information processing apparatus 60 is provided in place of the information processing apparatus 40 provided in the first example embodiment. Since the basic configuration of the information processing system is similar to that in the first example embodiment, the descriptions thereof will be omitted. The third example embodiment is different from the first example embodiment in terms of the method of calculating the similarity between accounts.

<Configuration Example of Information Processing Apparatus>

Figure 10:
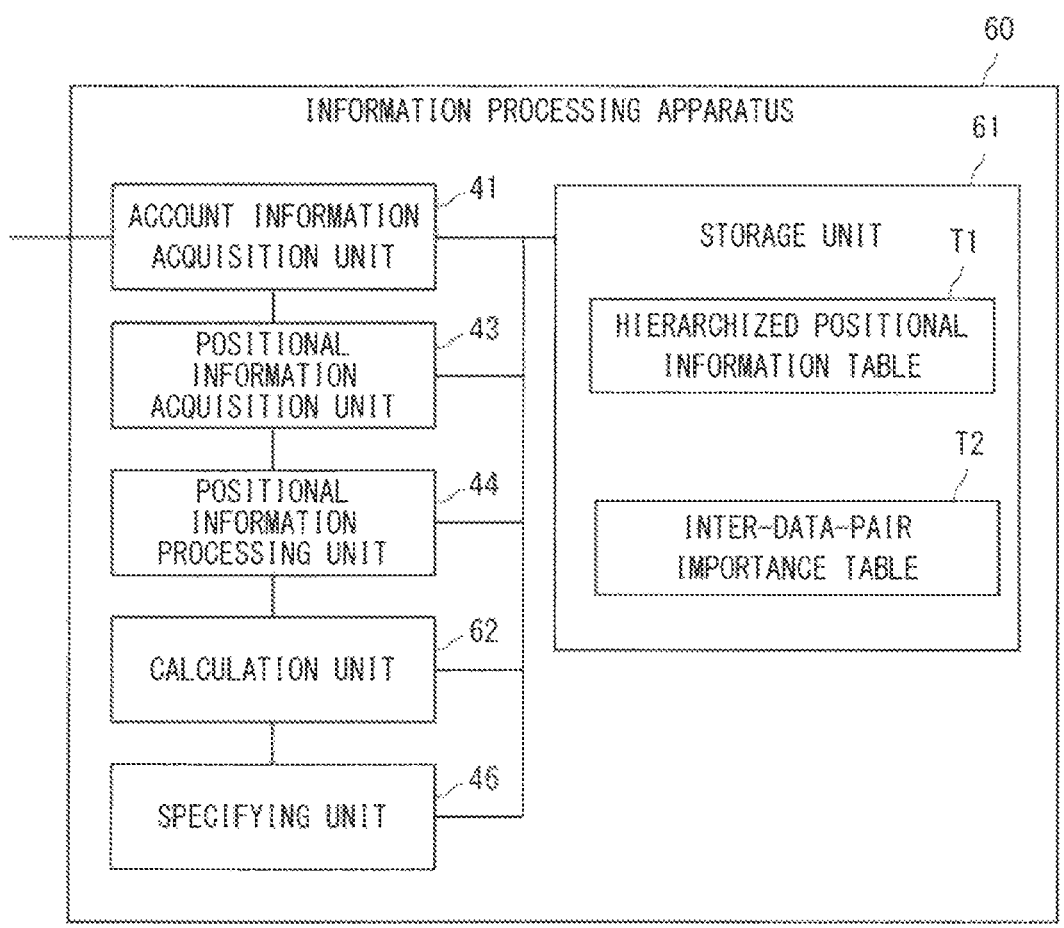
FIG. 10 is a diagram showing a configuration example of an information processing apparatus according to a third example embodiment.

With reference to FIG. 10, a configuration example of the information processing apparatus 60 according to the third example embodiment will be described. FIG. 10 is a diagram showing a configuration example of the information processing apparatus according to the third example embodiment. The information processing apparatus 60 according to the third example embodiment has a configuration in which the storage unit 42 and the calculation unit 45 of the information processing apparatus 40 according to the first example embodiment are respectively replaced by a storage unit 61 and a calculation unit 62. Since the other configurations are similar to those of the first example embodiment, the descriptions thereof will be omitted as appropriate, and the contents that are different from those of the first example embodiment will be described.

The storage unit 61 stores, besides the hierarchized positional information table T1, an inter-data-pair importance table T2 that will be described later.

The calculation unit 62 calculates, in each account, for each granularity level, for each data pair included in hierarchized positional information that corresponds to the granularity level, the distance between the data pair, and determines the importance of the data pair in accordance with the calculated distance. The distance between the data pair is a distance between two places (names of places) that correspond to the data pair. When, for example, the data pair is Fuchu city and Hino city, the distance between the data pair is a distance between Fuchu city and Hino city. Accordingly, the calculation unit 62 applies a weight to the data pair that is specific to the related account based on the importance of the data pair, thereby calculating more optimal similarity between accounts.

Further, in this example embodiment, when determining the importance of the data pair, the calculation unit 62 determines the importance of the data pair based on the number of times of appearance of the data pair (the number for each data pair), in addition to the distance between the data pair. While it is unlikely that accounts having a data pair whose distance between them is far from each other appear as related accounts, when the number of times of appearance is large, it can be considered that this data pair is an important data pair. Therefore, in this example embodiment, a data pair in which the distance from each other is large and the frequency of appearance is high is regarded as an important data pair and a larger weight is applied to this data pair.

The calculation unit 62 calculates, for each granularity level, the similarity for each granularity level between accounts using the importance of the data pair that has been determined, and calculates the total sum of the similarities for each of all the granularities as the similarity between accounts.

Now, when the importance of data pair $l_1$ and $l_2$ included in the hierarchized positional information of one granularity level of the account A is expressed by $w(l_1,l_2,A)$, the importance $w(l_1,l_2,A)$ can be expressed as shown in the following relational expression (2).

$$w(l_1, l_2, A) = \sqrt{f(l_1, A)f(l_2, A)}\, ip(l_1, l_2) \quad (2)$$

where $$f(l_1, A) = \frac{n_{l_1,A}}{\sum_{l \in A} n_{l,A}}$$

$n_{l_1,A}$ : Number of times of appearance of data $l_1$ in one granularity level in account A $$f(l_2, A) = \frac{n_{l_2,A}}{\sum_{l \in A} n_{l,A}}$$

$n_{l_2,A}$ : Number of times of appearance of data $l_2$ in one granularity level in account A $$ip(l_1, l_2)\log = \frac{1}{p(dist(l_1, l_2))}$$

$p$ : Probability $dist(l_1, l_2)$ that data (names of places) $l_1$ and $l_2$ are both included in the related account of account A $dist(l_1, l_2)$ : distance between data(names of places) $l_1$ and $l_2$ As shown above, $w(l_1,l_2,A)$ is a value obtained by weighting $f(l_1,A)$ and $f(l_2,A)$ by $ip(l_1,l_2)$. The probability p indicates a probability that the distance $dist(l_1,l_2)$ between the data pair $l_1$ and $l_2$ is included in a random variable and data (names of places) $l_1$ and $l_2$ are both included in the hierarchized positional information of one granularity level of the related account of the account A. The probability p may be, for example, normal distribution. The calculation unit 62 multiplies a reciprocal of the above probability p by the number of times of appearance of data $l_1$ and $l_2$ included in the hierarchized positional information for each granularity, thereby calculating and determining the importance of the data pair included in the hierarchized positional information of one granularity level of the account A.

The calculation unit 62 may calculate the distance dist $(l_1,l_2)$ between the data pair $l_1$ and $l_2$ using Global Positioning System (GPS) data of each of the pieces of data (names of places) $l_1$ and $l_2$. The calculation unit 62 may acquire, when converting the name of place into the GPS data, for example, the GPS data of the representative point in the name of place such as the capital of the name of the place and a central place from, for example, the Internet or the like.

The calculation unit 62 calculates, for each granularity, the importance between the data pair included in the hierarchized positional information of the granularity level for all the data pairs, and then generates the inter-data-pair importance table T2.

With reference now to FIG. 11, the inter-data-pair importance table T2 will be described. FIG. 11 is a diagram for describing the inter-data-pair importance table. FIG. 11 shows the inter-data-pair importance table T2 of the account A. In the inter-data-pair importance table T2, the importance between the data pair included in the hierarchized positional information for each granularity level is set in one table. Since the granularity levels are the units of "countries", "prefectures", and "cities/wards/towns/villages" in this example embodiment, the inter-data-pair importance table T2 is composed of three tables. As a matter of course, since the inter-data-pair importance table T2 shown in FIG. 11 is merely one example, the granularity level may be included as index information, for example, and the importance between the data pair included in the hierarchized positional information for each of all the granularity levels may be managed by one table.

Taking a table in which the importance between the data pair included in the hierarchized positional information of the granularity level of units of "countries" are listed as an example. Each of the pieces of data included in the hierarchized positional information of the granularity level by units of "countries" is set in each row and each column of this table. FIG. 11 shows a table when $l_1$, $l_2$, $l_3$, and $l_4$ are included as data (names of places) included in the hierarchized positional information of the account A. FIG. 11 shows, for example, that the importance for the data pair $l_1$ and $l_2$ is $w(l_1,l_2,A)$. While oblique lines are drawn regarding the importance on the upper right side of the table shown in FIG. 11, this means folding back of the lower left side, that is, it means that calculations are omitted since the importance that is the same as that of the data on the lower left side is set. Specifically, since the importance of $w(l_1,l_4,A)$ and that of $w(l_4,l_1,A)$ are the same, only $w(l_1,l_4,A)$ is calculated and calculation of $w(l_4,l_1,A)$ is omitted.

The calculation unit 62 calculates the importance between the data pair included in the hierarchized positional information of each account for all the granularity levels of the units of "countries", "prefectures", and "cities/wards/towns/villages", thereby generating the inter-data-pair importance table T2. Further, the calculation unit 62 generates the inter-data-pair importance table T2 for all the accounts.

After the calculation unit 62 generates the inter-data-pair importance table T2, it calculates the similarity between accounts for each granularity level using the inter-data-pair importance table T2. It is assumed, for example, that it calculates the similarity for each granularity level between the account A and the account A'. In this case, the calculation unit 62 multiplies, for each data pair that is common to the account A and the account A', the importance of the data pair in the account A by the importance of the data pair in the account A', thereby calculating the evaluation value for this data pair. Then the calculation unit 62 calculates the total sum of the evaluation values of all the data pairs that are common to the account A and the account A' as the similarity for each granularity level between the account A and the account A'. Then the calculation unit 62 calculates the total of the similarities obtained by multiplying weights in accordance with the granularity levels by the similarity for each granularity level of the account A and the account A' for all the granularity levels, thereby obtaining the similarity between the account A and the account A'.

The above contents can be expressed by a mathematical expression as follows. When the weighting coefficients for the respective granularity levels are denoted by $\alpha$, $\beta$, and $\gamma$ and they are weighting coefficients that satisfy the relationship $\alpha+\beta+\gamma=1$, the similarity between the account A and the account A' can be expressed as shown in the following relational expression (3). The weighting coefficients $\alpha$, $\beta$, and $\gamma$ can be set freely depending on the granularity level that is desired to be emphasized. Further, the similarity between the account A and the account A' is described as an "integrated score". Further, the similarity of the granularity level "countries" is described as "similarity of countries", the similarity of the granularity level "prefectures" is described as "similarity of prefectures", and the similarity of the granularity level "cities/wards/towns/villages" is described as "similarity of cities/wards/towns/villages".

$$\text{(Integrated score)} = \alpha \times \text{(similarity of countries)} + \beta \times \text{(similarity of prefectures)} + \gamma \times \text{(similarity of cities/wards/towns/villages)} \quad (3)$$

It is assumed here that $L_A$ is the number of pieces of data of hierarchized positional information that are associated with one of the accounts A and A' and in which the granularity level is the unit of countries. It is further assumed that $w(l_i,l_j,\text{country},A)$ is the importance of the data pair of the data $l_i$ and $l_j$ included in the hierarchized positional information in which the granularity level of the account A is the unit of countries. It is further assumed that $w(l_i,l_j,\text{country},A')$ is the importance of the data pair of the data $l_i$ and $l_j$ included in the hierarchized positional information in which the granularity level of the account A' is the unit of countries. In this case, the similarity of countries can be expressed as shown in the following relational expression (4).

$$\text{(Similarity of countries)} = \sum_{i=1}^{L_A}\sum_{j=1}^{L_A} score(l_i, l_j, \text{country}, A, A') \quad (4)$$

$$score(l_i, l_j, \text{country}, A, A') = \begin{cases} w(l_i, l_j, \text{country}, A) \times w(l_i, l_j, \text{country}, A') & l_i, l_j \in A, A' \\ 0 & \text{other} \end{cases}$$

Further, it is assumed that $M_A$ is the number of pieces of data of hierarchized positional information that are associated with one of the accounts A and A' and in which the granularity level is the unit of prefectures. It is further assumed that prefecture, A) is the importance of the data pair of the data $l_i$ and $l_j$ included in the hierarchized positional information in which the granularity level of the account A is the unit of prefectures. It is further assumed that $w(l_i,l_j,\text{prefecture},A')$ is the importance of the data pair of the data $l_i$ and $l_j$ included in the hierarchized positional information in which the granularity level of the account A' is the unit of prefectures. In this case, the similarity of prefectures can be expressed as shown in the following relational expression (5).

$$\text{(Similarity of prefectures)} = \sum_{i=1}^{M_A}\sum_{j=1}^{M_A} score(l_i, l_j, \text{prefecture}, A, A') \quad (5)$$

$$score(l_i, l_j, \text{prefecture}, A, A') = \begin{cases} w(l_i, l_j, \text{prefecture}, A) \times w(l_i, l_j, \text{prefecture}, A') & l_i, l_j \in A, A' \\ 0 & \text{other} \end{cases}$$

It is further assumed that $N_A$ is the number of pieces of data of hierarchized positional information that are associated with one of the accounts A and A' and in which the granularity level is the unit of cities/wards/towns/villages. It is further assumed that $(l_i,l_j,\text{city/ward/town/village},A)$ is the importance of the data pair of the data $l_i$ and $l_j$ included in the hierarchized positional information in which the granularity level of the account A is the unit of cities/wards/towns/villages. It is further assumed that city/ward/town/village, A') is the importance of the data pair of the data $l_i$ and $l_j$ included in the hierarchized positional information in which the granularity level of the account A' is the unit of cities/wards/towns/villages. In this case, the similarity of cities/wards/towns/villages can be expressed by the following relational expression (6).

(Similarity of cities/wards/towns/villages) =  (6)

$$\sum_{i=1}^{N_A}\sum_{j=1}^{N_A} score(l_i, l_j, \text{prefecture}, A, A')$$

$score(l_i, l_j, \text{city/ward/town/village}, A, A') =$ $$\begin{cases} w(l_i, l_j, \text{city/ward/town/village}, A) \times \\ w(l_i, l_j, \text{citiy/ward/town/village}, A') \quad l_i, l_j \in A, A' \\ 0 \quad \text{other} \end{cases}$$

<Operational Example of Information Processing Apparatus>

Figure 12A:
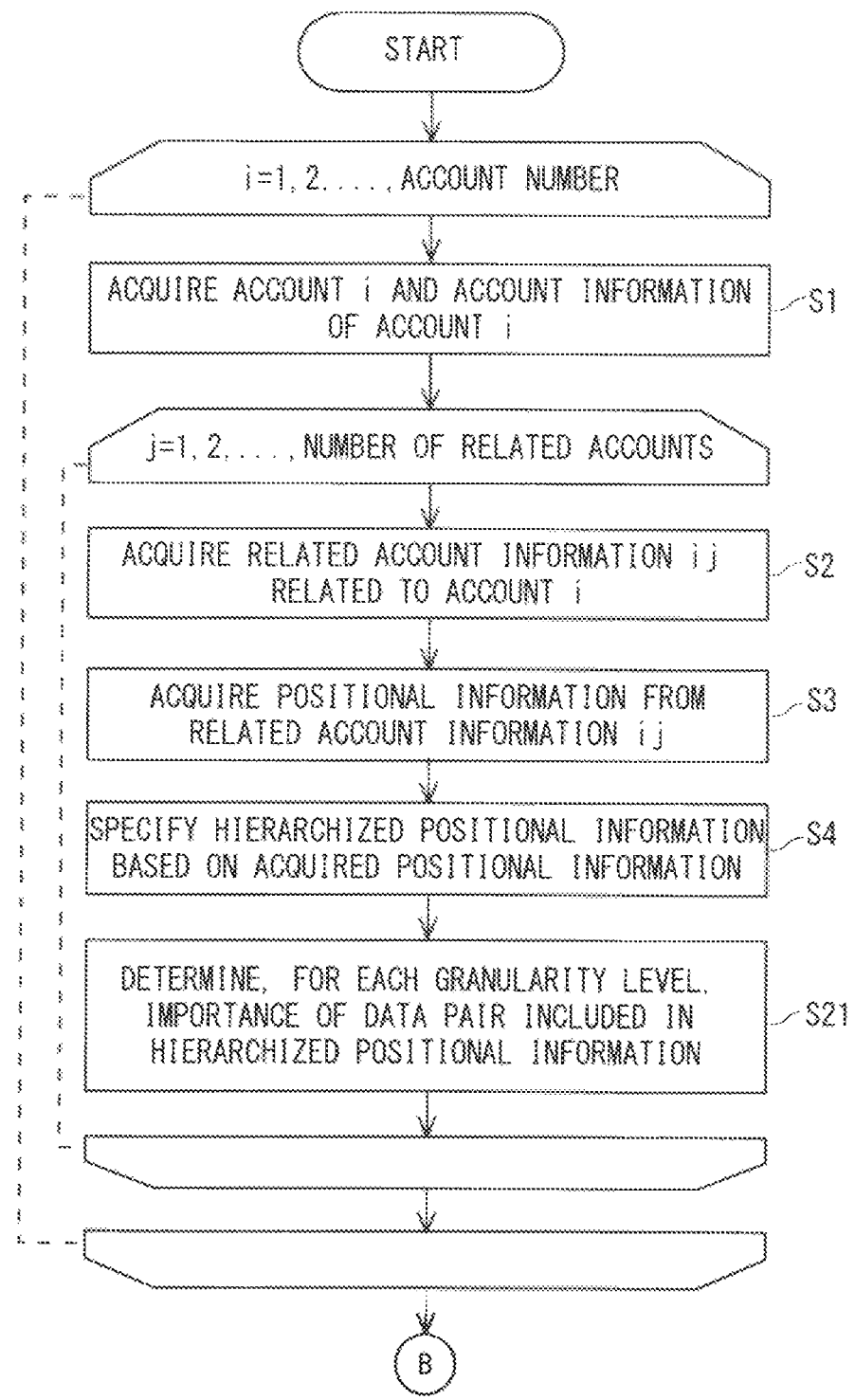
FIG. 12A is a flowchart showing an operational example of the information processing apparatus according to the third example embodiment.
Figure 12B:
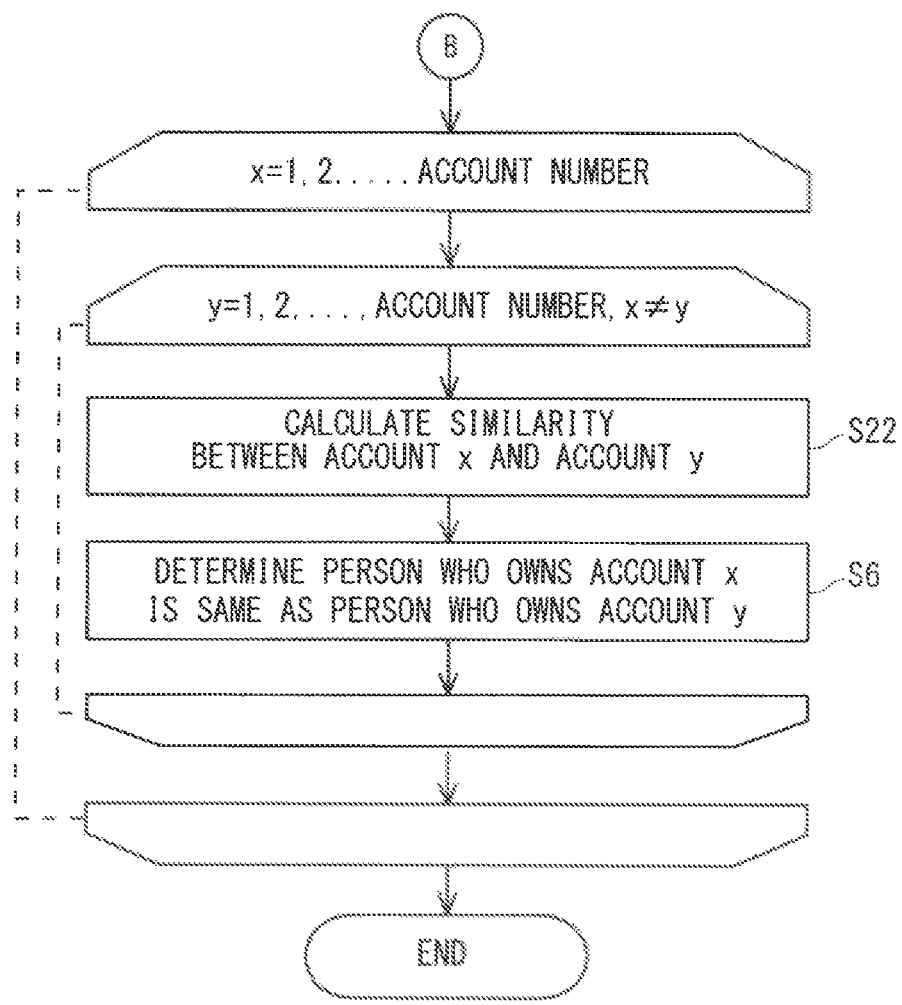
FIG. 12B is a flowchart showing an operational example of the information processing apparatus according to the third example embodiment.

Referring next to FIGS. 12A and 12B, an operational example of the information processing apparatus 60 according to the third example embodiment will be described. FIGS. 12A and 12B are flowcharts showing the operational example of the information processing apparatus according to the third example embodiment. Of the contents of the processing shown in FIGS. 12A and 12B, the contents of the processing that are common to those in FIG. 6 are denoted by the same reference symbols and the descriptions thereof will be omitted as appropriate. When FIGS. 9A and 9B are compared with FIG. 6, the content of the processing in Step S21 is added to the contents of the processing shown in FIG. 6 and Step S5 is replaced by Step S22.

First, the account information acquisition unit 41, the positional information acquisition unit 43, and the positional information processing unit 44 each execute Steps S1-S4 shown in FIG. 9A.

Next, the calculation unit 62 determines, for each granularity level, the importance of the data pair included in the hierarchized positional information of the granularity level (Step S21). Specifically, the calculation unit 62 calculates and determines, for each data pair included in the hierarchized positional information for each granularity level, the importance of the data pair using the above relational expression (2). The calculation unit 62 calculates and determines, for all the data pairs, the importance of the data pair. The calculation unit 62 further performs similar processing for all the granularity levels, and calculates and determines the importance of the data pair.

After Step S21 is executed, the information processing apparatus 60 performs processing shown in FIG. 12B. In Step S22, the calculation unit 62 calculates the similarity between the account x (x: 1-account number) and the account y (y: 1-account number, where x≠y) (Step S22). Specifically, the calculation unit 62 calculates the similarity for each granularity level for the account x and the account y. In this case, the calculation unit 62 calculates the similarity for each granularity level based on the above relational expressions (4)-(6). Then the calculation unit 62 calculates a total sum of values obtained by multiplying the calculated similarities for the respective granularity levels by weighting coefficients in accordance with the granularity levels as the similarity between the account x and the account y based on the above relational expression (3).

As described above, the information processing apparatus 60 according to the third example embodiment has configurations similar to those in the first example embodiment although the method of calculating the similarity between accounts is different from that in the first example embodiment. Therefore, with the information processing apparatus 60 according to the third example embodiment, it is possible to accurately specify identification information whose users are the same user regardless of information registered by users, like in the first example embodiment.

Further, the information processing apparatus 60 according to this example embodiment calculates the similarity between accounts using the importance of the data pair included in the hierarchized positional information for each granularity level. By using the importance of the data pair, a data pair that is specific to the account can be found using the probability p in which the distance dist ($l_1, l_2$) between the data pair is included as a random variable and both the data (names of places) $l_1$ and $l_2$ are included in the related accounts in one account A. That is, the information processing apparatus 60 according to this example embodiment applies a large weight to the data pair that is specific to the account, thereby calculating the similarity between accounts. Therefore, according to this example embodiment, it becomes possible to specify the accounts belonging to one person more accurately than in the first example embodiment.

Other Example Embodiments

<1> In the first example embodiment, the calculation unit 45 calculates the similarity between accounts for each granularity level by using the sum set of the data included in the hierarchized positional information for each granularity level. However, this configuration is merely an example and the calculation unit 45 may calculate, for example, the similarity between accounts for each granularity level using a product set of data included in the hierarchized positional information for each granularity level.

Specifically, with reference to the upper diagram and the lower diagram of FIG. 4, of the data of the hierarchized positional information whose granularity level is "country", the data that is common to the account A and the account B is "Japan". Therefore, the calculation unit 45 extracts "Japan" as the product set. Likewise, the calculation unit 45 extracts, of the data of the hierarchized positional information whose granularity level is "prefecture", the data "Tokyo", which is common to the account A and the account B. Since the data of the hierarchized positional information whose granularity level is "city/ward/town/village" does not include the data that is common to the account A and the account B, the calculation unit 45 extracts no data.

The calculation unit 45 counts, for the account A and the account B, the number for each data that has been extracted, and normalizes the number for each data that has been counted by the number of pieces of relation information. The calculation unit 45 multiplies, for each of the pieces of data, the normalized value of the account A by the normalized value of the account B, thereby calculating the evaluation value for this data. The calculation unit 45 determines the total sum of the evaluation values for all the pieces of data to be the similarity for each granularity level. Even with this operation, the calculation unit 45 is able to calculate the similarity for each granularity level between the account A and the account B in a way similar to that described above.

<2> While the importance of the data pair has been calculated based on the distance between the data pair in the aforementioned third example embodiment, this importance may be calculated using, for example, the population ratio in the places (names of places) that correspond to each data pair calculated from the population in the places that correspond to the respective pieces of data, an index value regarding easiness of movement between two places (names of places) corresponding to each data pair or the like.

Alternatively, the importance of the data pair may be determined in accordance with the ratio of each data pair to the total number of data pairs.

The index value regarding the easiness of movement may be determined by time that is required to move between two places included as a data pair. Alternatively, the index value regarding easiness of movement may be determined depending on whether there is a direct flight between two places included as a data pair and the number of direct flights.

When the importance of the data pair is calculated using a population ratio between a data pair, $ip(l_1,l_2)$ and p in the aforementioned Expression (2) may be replaced as follows. When the population that is present in the data (name of place) $l_1$ is denoted by $N_1$, the population that is present in the data (name of place) $l_2$ is denoted by $N_2$, and the total population on the earth is denoted by N, the importance can be calculated using Expression (7).

$$p = N_1/N * N_2/N$$

$$ip(l_1,l_2) = \log(1/p) \quad (7)$$

Further, while the probability p has been described as normal distribution in the aforementioned third example embodiment, the normal distribution may not be used. Further, the parameter regarding the probability distribution of the probability p may be determined by the account information collected in advance and the related account information.

When the importance of the data pair is calculated in accordance with the ratio of each data pair to the total number of data pairs, the probability p may be replaced by $p(l_1,l_2)$ in the aforementioned Expression (2). That is, while the probability p uses the distance $dist(l_1,l_2)$ between the data pair $l_1$ and $l_2$ for the random variable in Expression (2), the distance $dist(l_1,l_2)$ may not be used. The ratio of each data pair to the total number of data pairs may be determined either by data that corresponds to the related account related to the accounts to be determined or by data that corresponds to the account that is not related to the accounts to be determined and is collected in advance.

When the ratio of each data pair to the total number of data pairs is determined by the data that corresponds to the related account related to the accounts to be determined, the ratio may be determined as follows. It is assumed, for example, that the accounts to be determined are A, B, and C, the related accounts of the account A are $A_1'$ and $A_2'$, the related accounts of the account B are $B_1'$ and $B_2'$, and the related accounts of the account C are $C_1'$ are $C_2'$. It is assumed that the related account $A_1'$ includes $l_1$ and the related account $A_2'$ includes $l_2$ as the hierarchized positional information of one granularity level. Likewise, it is assumed that the related account $B_1'$ includes $l_2$, the related account $B_2'$ includes $l_3$, the related account $C_1'$ includes $l_1$, and the related account $C_2'$ includes $l_3$. The data pair included in the related accounts is one pair $(l_1,l_2)$ in the account A, one pair $(l_2,l_3)$ in the account B, and one pair $(l_1,l_3)$ in the account C. Further, all the data pairs that may exist are $(l_1,l_1)$, $(l_2,l_2)$, $(l_3,l_3)$, $(l_1,l_2)$, $(l_1,l_3)$, $(l_2,l_3)$ and the total number of data pairs is 6. In this case, the ratio of each data pair to the total number of data pairs is calculated to be, for example, $p(l_1,l_2)=1/6$ for the account A. Likewise, $p(l_2,l_3)=1/6$ for the account B and $p(l_1,l_3)=1/6$ for the account C. Therefore, in Expression (2), the importance of the data pair may be calculated using the above values.

Further, when the ratio of each data pair to the total number of data pairs is determined by the data that corresponds to the account that is not related to the accounts to be determined and is collected in advance, the ratio may be determined as follows. It is assumed, for example, that the accounts collected in advance are A, B, and C, the related accounts of the account A are $A_1'$ and $A_2'$, the related accounts of the account B are $B_1'$ and $B_2'$, and the related accounts of the account C are $C_1'$ and $C_2'$. As the hierarchized positional information of one granularity level, it is assumed that the related account $A_1'$ includes $l_1$ and the related account $A_2'$ includes $l_2$. Likewise, it is assumed that the related account $B_1'$ includes $l_2$, the related account $B_2'$ includes $l_3$, the related account $C_1'$ includes $l_1$, and the related account $C_2'$ includes $l_3$. The data pair included in the related accounts is one pair $(l_1,l_2)$ in the account A, one pair $(l_2,l_3)$ in the account B, and one pair $(l_1,l_3)$ in the account C. Further, all the data pairs that may exist are $(l_1,l_1)$, $(l_2,l_2)$, $(l_3,l_3)$, $(l_1,l_2)$, $(l_1,l_3)$, and $(l_2,l_3)$, and the total number of data pairs is 6. In this case, the ratio of each data pair to the total number of data pairs is calculated to be, for example, $p(l_1,l_2)=1/6$ for the account A. Likewise, $p(l_2,l_3)=1/6$ for the account B and $p(l_1,l_3)=1/6$ for the account C.

It is assumed that the accounts to be determined are accounts D and E. It is further assumed that the related accounts are related accounts $D_1'$ and $D_2'$ and related accounts $E_1'$ and $E_2'$, respectively. It is further assumed that the related account $D_1'$ includes $l_1$, the related account $D_2'$ includes $l_2$, the related account $E_1'$ includes $l_2$, and the related account $E_2'$ includes $l_3$. In this case, the probability p of the data pair obtained from the accounts collected in advance is set for the account D. Likewise, the probability p of the data pair obtained from the accounts collected in advance is set for the account E. Specifically, $p(l_1,l_2)=1/6$ is set for the account D and $p(l_1,l_2)=1/6$ is set for the account E. Then, in Expression (2), the importance of the data pair may be calculated using these values.

Figure 13:
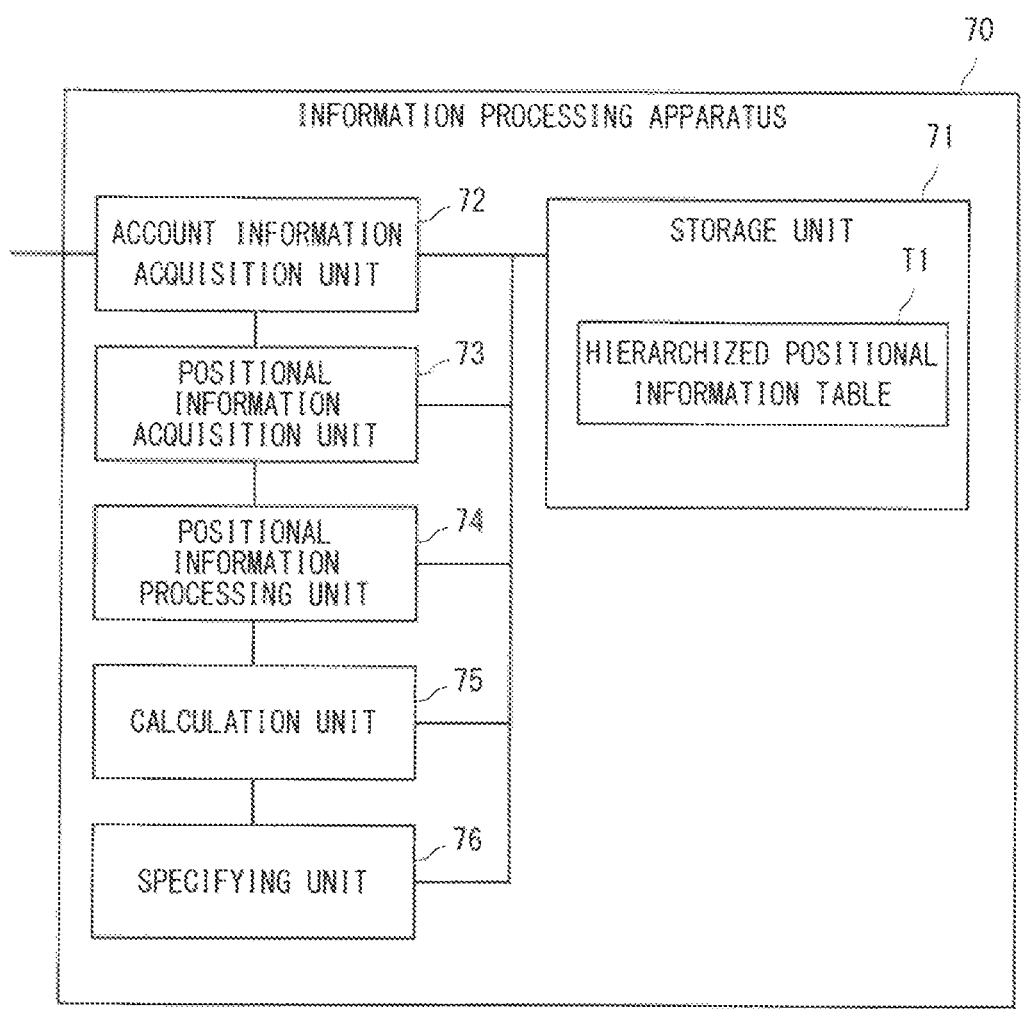
FIG. 13 is a diagram showing a configuration example of an information processing apparatus according to other example embodiments.

<3> While the information processing apparatus and the SNS server are apparatuses different from each other in the above-described example embodiments, each function of the information processing apparatus may be implemented in the SNS server. FIG. 13 is a diagram showing a configuration example of an information processing apparatus according to other example embodiments. An information processing apparatus 70 includes a storage unit 71, an account information acquisition unit 72, a positional information acquisition unit 73, a positional information processing unit 74, a calculation unit 75, and a specifying unit 76. While the basic configuration of the information processing apparatus 70 is similar to that of the information processing apparatus 40 according to the first example embodiment, it may have a configuration similar to those of the second and third example embodiments.

The storage unit 71 stores all the accounts subscribed to the SNS and the account information of each account.

The account information acquisition unit 72, which is formed, for example, as input means such as a keyboard or a mouse, is configured to receive the account to be determined input from the user and the related account information that is related to this account. Further, the account information acquisition unit 72 specifies, for each of the accounts stored in the storage unit 71, the related account and acquires the related account information associated with the specified related account. Then the account information acquisition unit 72 associates each of the pieces of account information and the related account information in the storage unit 71.

The positional information acquisition unit 73 acquires the positional information from the related account information input to the account information acquisition unit 72.

The positional information acquisition unit 73 further acquires, for all the accounts stored in the storage unit 71, positional information from the related account information related to each account.

The positional information processing unit 74 specifies the hierarchized positional information of all the pieces of related account information.

The calculation unit 75 calculates the similarity between the account input to the account information acquisition unit 72 and all the accounts stored in the storage unit 71.

The specifying unit 76 specifies the account whose user is the same as the user of the account input to the account information acquisition unit 72 from among all the accounts stored in the storage unit 71 based on the similarity between accounts calculated by the calculation unit 75. Further, the specifying unit 76 may be configured to output the specified accounts belonging to one user. According to this configuration as well, it is possible to accurately specify identification information whose users are the same user regardless of information registered by users, like in the above-described example embodiments.

Figure 14:
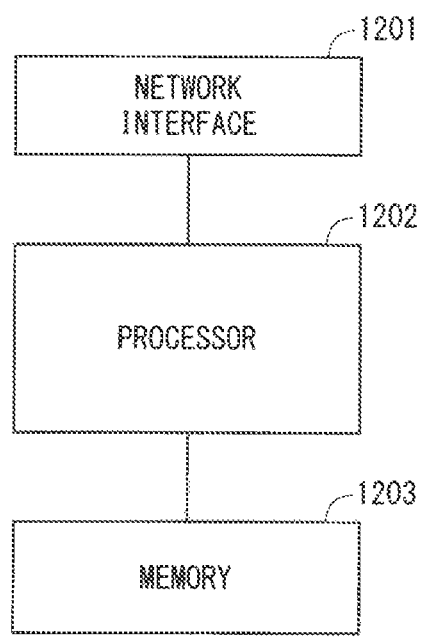
FIG. 14 is a schematic configuration diagram showing a configuration example of the information processing apparatus according to other example embodiments.

<4> FIG. 14 is a block diagram showing a configuration example of the information processing apparatus 1, 40, 50, 60, and 70 (hereinafter they are referred to as information processing apparatus 1 and the like) described in the above-described example embodiments. With reference to FIG. 14, the information processing apparatus 1 and the like each include a network interface 1201, a processor 1202, and a memory 1203. The network interface 1201 is used to communicate with the SNS server 20 and the like. The network interface 1201 may include, for example, a network interface card (NIC) in compliance with IEEE 802.11 series or IEEE 802.3 series.

The processor 1202 loads software (computer program) from the memory 1203 and executes the loaded software (computer program), thereby performing the processing of the information processing apparatus 1 and the like described with reference to the flowcharts in the aforementioned example embodiments. The processor 1202 may be, for example, a microprocessor, a Micro Processing Unit (MPU), or a Central Processing Unit (CPU). The processor 1202 may include a plurality of processors.

The memory 1203 is composed of a combination of a volatile memory and a non-volatile memory. The memory 1203 may include a storage located apart from the processor 1202. In this case, the processor 1202 may access the memory 1203 via an I/O interface (not shown).

In the example shown in FIG. 14, the memory 1203 is used to store software modules. The processor 1202 loads these software modules from the memory 1203 and executes these loaded software modules, thereby being able to perform processing of the information processing apparatus 1 and the like described in the above example embodiments.

As described above with reference to FIG. 14, each of the processors included in the information processing apparatus 1 and the like executes one or more programs including instructions for causing a computer to execute the algorithm described with reference to the drawings.

In the aforementioned examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.) and optical magnetic storage media (e.g., magneto-optical disks). Examples of non-transitory computer readable media further include CD-Read Only Memory (ROM), CD-R, and CD-R/W. Examples of non-transitory computer readable media further include semiconductor memories. The semiconductor memories include, for example, mask ROM, Programmable ROM (PROM), Erasable PROM (EPROM), flash ROM, Random Access Memory (RAM), etc.). The program(s) may further be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the aforementioned example embodiments and may be changed as appropriate without departing from the scope of the present disclosure. Further, in the present disclosure, the example embodiments may be combined as appropriate.

The whole or part of the example embodiments disclosed above can be described as, but not limited to, the following supplementary notes.

(Supplementary Note 1)

An information processing apparatus comprising:

positional information acquisition means for acquiring positional information associated with at least one piece of related identification information related to each of a plurality of pieces of identification information to be determined, each of the pieces of identification information identifying users in a communication service;

positional information processing means for specifying hierarchized positional information indicating positional information hierarchized in accordance with a granularity level of a position based on the positional information;

calculation means for calculating a similarity between pieces of identification information using the hierarchized positional information; and specifying means for specifying pieces of identification information belonging to one user from among the plurality of pieces of identification information based on the similarity that has been calculated.

(Supplementary Note 2)

The information processing apparatus according to Supplementary Note 1, wherein the calculation means calculates, using the hierarchized positional information for each granularity level, similarities for the respective granularity levels between the pieces of identification information, and calculates a total sum of similarities obtained by multiplying the calculated similarities for the respective granularity levels by weighting coefficients in accordance with the respective granularity levels as the similarity between the pieces of identification information.

(Supplementary Note 3)

The information processing apparatus according to Supplementary Note 2, wherein the calculation means counts, in each identification information, for each of the granularity levels, the number for each data included in the hierarchized positional information associated with the granularity level, calculates a value obtained by normalizing the number for each data that has been counted by the number of related identifications, and calculates the similarities for the respective granularity levels between the pieces of identification information using the normalized value that has been calculated.

(Supplementary Note 4)

The information processing apparatus according to Supplementary Note 3, wherein the calculation means calculates, for each piece of data that is common to first identification information and second identification information based on which the similarities for the respective granularity levels between the pieces of identification information are calculated, an evaluation value for the data by multiplying the normalized value in the first identification information by the normalized value in the second identification information, and calculates a total sum of the evaluation values for all the pieces of data that are common to the first identification information and the second identification information as the similarity for each of the granularity levels between the first identification information and the second identification information.

(Supplementary Note 5)

The information processing apparatus according to Supplementary Note 2, wherein the calculation means determines, in each identification information, for each of the granularity levels, importance of a data pair for each data pair included in hierarchized positional information that corresponds to the granularity level and calculates the similarities for the respective granularity levels between the pieces of identification information using the importance of the data pair.

(Supplementary Note 6)

The information processing apparatus according to Supplementary Note 5, wherein the importance of the data pair is determined in accordance with at least one of a distance between two names of places that correspond to the data pair, a population ratio between the two names of places that correspond to the data pair, an index value regarding easiness of movement between the two names of places that correspond to the data pair, and a ratio of the data pair to a total number of data pairs.

(Supplementary Note 7)

The information processing apparatus according to Supplementary Note 6, wherein the importance of the data pair is determined based on at least one of the distance, the index value regarding easiness of movement, and the population ratio, and the number of times of appearance of the data pair.

(Supplementary Note 8)

The information processing apparatus according to any one of Supplementary Notes 5 to 7, wherein the calculation means calculates, for each data pair that is common to first identification information and second identification information based on which the similarities for the respective granularity levels between the pieces of identification information are calculated, the evaluation value for the data pair by multiplying the importance of the data pair in the first identification information by the importance of the data pair in the second identification information, and calculates a total sum of the evaluation values for all the data pairs that are common to the first identification information and the second identification information as the similarity for each of the granularity levels between the first identification information and the second identification information.

(Supplementary Note 9)

The information processing apparatus according to any one of Supplementary Notes 2 to 8, wherein the higher the granularity level becomes, the larger the weight applied by the calculation means becomes.

(Supplementary Note 10)

The information processing apparatus according to any one of Supplementary Notes 1 to 9, further comprising related identification information selection means for determining the relevance degree between related identification information and selecting one of the at least one piece of related identification information based on the relevance degree, wherein the positional information acquisition means acquires positional information associated with the related identification information selected by the related identification information selection means.

(Supplementary Note 11)

The information processing apparatus according to Supplementary Note 10, wherein the related identification information selection means specifies second related identification information related to first related identification information of the at least one piece of related identification information, and determines, when the second related identification information is included in the at least one piece of related identification information, that the relevance degree between the first related identification information and the second related identification information is high, and selects related identification information with the high relevance degree from among the at least one piece of related identification information.

(Supplementary Note 12)

The information processing apparatus according to any one of Supplementary Notes 1 to 11, wherein the specifying means determines, when the similarity that has been calculated is equal to or larger than a predetermined threshold, that users who own two pieces of identification information based on which the similarity is calculated are the same user.

(Supplementary Note 13)

The information processing apparatus according to any one of Supplementary Notes 1 to 12, further comprising:

identification information acquisition means for acquiring the plurality of pieces of identification information, the related identification information, and the information associated with the related identification information; and storage means for storing the plurality of pieces of identification information, the related identification information, and the information associated with the related identification information in association with one another, wherein positional information acquisition means acquires the positional information from the stored information associated with the related identification information.

(Supplementary Note 14)

The information processing apparatus according to Supplementary Note 13, wherein the information associated with the related identification information comprises at least one of profile information and posted information.

(Supplementary Note 15)

The information processing apparatus according to any one of Supplementary Notes 1 to 14, wherein the identification information comprises at least one of an account and a telephone number.

(Supplementary Note 16)

A determination method comprising:

acquiring positional information associated with at least one piece of related identification information related to each of a plurality of pieces of identification information to be determined, each of the pieces of identification information identifying users in a communication service;

specifying hierarchized positional information indicating positional information hierarchized in accordance with a granularity level of a position based on the positional information;

calculating a similarity between pieces of identification information using the hierarchized positional information; and specifying pieces of identification information belonging to one user from among the plurality of pieces of identification information based on the similarity that has been calculated.

(Supplementary Note 17)

A non-transitory computer readable medium storing a program for causing a computer to execute the following processing of:

acquiring positional information associated with at least one piece of related identification information related to each of a plurality of pieces of identification information to be determined, each of the pieces of identification information identifying users in a communication service;

specifying hierarchized positional information indicating positional information hierarchized in accordance with a granularity level of a position based on the positional information;

calculating a similarity between pieces of identification information using the hierarchized positional information; and specifying pieces of identification information belonging to one user from among the plurality of pieces of identification information based on the similarity that has been calculated.

(Supplementary Note 18)

An information processing system comprising:

a server configured to provide a communication service; and an information processing apparatus configured to perform communication with the server, wherein the information processing apparatus comprises:

positional information acquisition means for acquiring positional information associated with at least one piece of related identification information related to each of a plurality of pieces of identification information to be determined, each of the pieces of identification information identifying users in the communication service;

positional information processing means for specifying hierarchized positional information indicating positional information hierarchized in accordance with a granularity level of a position based on the positional information;

calculation means for calculating a similarity between pieces of identification information using the hierarchized positional information; and specifying means for specifying pieces of identification information belonging to one user from among the plurality of pieces of identification information based on the similarity that has been calculated.

(Supplementary Note 19)

The information processing system according to Supplementary Note 18, wherein the calculation means calculates the similarities for the respective granularity levels between the pieces of identification information using the hierarchized positional information for each granularity level, and calculates a total value of the similarities obtained by multiplying the calculated similarities for the respective granularity levels by weighting coefficients in accordance with the granularity levels as the similarity between the pieces of identification information.

REFERENCE SIGNS LIST 1, 40, 50, 60, 70 Information Processing Apparatus
2, 43, 73 Positional Information Acquisition Unit
3, 44, 74 Positional Information Processing Unit
4, 45, 62, 75 Calculation Unit
5, 46, 76 Specifying Unit
20 SNS Server
30 Network
41, 72 Account Information Acquisition Unit
42, 61, 71 Storage Unit
51 Related account Information Selection Unit
100 Information Processing System

The invention claimed is:

1. An information processing apparatus comprising:
at least one memory storing instructions; and
at least one processor configured to execute the instructions to:
acquire positional information associated with at least one piece of related identification information related to each of a plurality of pieces of identification information, each of the pieces of identification information identifying a user in a communication service;
specify hierarchized positional information indicating positional information hierarchized in accordance with a granularity level of a position based on the positional information, wherein the granularity level is one of a plurality of granularity levels;
calculate a similarity between pieces of identification information using the hierarchized positional information; and
specify pieces of identification information belonging to one user from among the plurality of pieces of identification information based on the similarity that has been calculated, wherein the at least one processor is further configured to execute the instructions to:
determine, in each identification information, for each of the plurality of granularity levels, importance of a data value pair for each of a plurality of data value pairs included in hierarchized positional information that corresponds to the granularity level and calculate similarities for the respective granularity levels between the pieces of identification information using the importance of the data value pair, and
calculate, for each of the plurality of data value pairs that is common to first identification information and second identification information based on which the similarities for the respective granularity levels between the pieces of identification information are calculated, an evaluation value for the data value pair by multiplying the importance of the data value pair in the first identification information by the importance of the data value pair in the second identification information, and calculate a total sum of the evaluation values for all the data value pairs that are common to the first identification information and the second identification information as the similarity for each of the plurality of granularity levels between the first identification information and the second identification information.

2. The information processing apparatus according to claim 1, wherein the the at least one processor is configured to execute the instructions to calculate, using the hierarchized positional information for each granularity level of the plurality of granularity levels, similarities for the respective granularity levels between the pieces of identification information, and calculate a total sum of similarities obtained by multiplying the calculated similarities for the respective granularity levels by weighting coefficients in accordance with the respective granularity levels as the similarity between the pieces of identification information.

3. The information processing apparatus according to claim 2, wherein the at least one processor is configured to execute the instructions to count, in each identification information, for each of the granularity levels, the total number for each data value included in the hierarchized positional information associated with the granularity level, calculate a value obtained by normalizing the total number for each data value that has been counted by the number of related identifications, and calculate the similarities for the respective granularity levels between the pieces of identification information using the normalized value that has been calculated.

4. The information processing apparatus according to claim 3, wherein the at least one processor is configured to execute the instructions to calculate, for each data value that is common to the first identification information and the second identification information based on which the similarities for the respective granularity levels between the pieces of identification information are calculated, an evaluation value for the data value by multiplying the normalized value in the first identification information by the normalized value in the second identification information, and calculate a total sum of the evaluation values for all the data values that are common to the first identification information and the second identification information as the similarity for each of the granularity levels between the first identification information and the second identification information.

5. The information processing apparatus according to claim 2, wherein the higher the granularity level becomes, the larger the weight applied by the calculation unit becomes.

6. The information processing apparatus according to claim 1, wherein the at least one processor is configured to determine the importance of the data value pair is in accordance with at least one of a distance between two places that correspond to the data value pair, a population ratio between the two places that correspond to the data value pair, an index value regarding easiness of movement between the two places that correspond to the data value pair, and a ratio of the data value pair to a total number of data value pairs.

7. The information processing apparatus according to claim 6, wherein the at least one processor is configured to determine the importance of the data value pair based on at least one of the distance, the index value regarding easiness of movement, and the population ratio, and the number of times of appearance of the data value pair.

8. The information processing apparatus according to claim 1, wherein the at least one processor is configured to determine the relevance degree between related identification information and select one of the at least one piece of related identification information based on the relevance degree, and
acquire positional information associated with the related identification information selected by the related identification information selection unit.

9. The information processing apparatus according to claim 8, wherein the at least one processor is configured to specify second related identification information related to first related identification information of the at least one piece of related identification information, and determine, when the second related identification information is included in the at least one piece of related identification information, that the relevance degree between the first related identification information and the second related identification information is high, and select related identification information with the high relevance degree from among the at least one piece of related identification information.

10. The information processing apparatus according to claim 1, wherein the at least one processor is configured to determine, when the similarity that has been calculated is equal to or larger than a predetermined threshold, that users who own two pieces of identification information based on which the similarity is calculated are the same user.

11. The information processing apparatus according to claim 1, wherein the at least one processor is further configured to:
acquire the plurality of pieces of identification information, the related identification information, and information associated with the related identification information;
store, in a storage unit, the plurality of pieces of identification information, the related identification information, and the information associated with the related identification information in association with one another, and
acquire the positional information from the stored information associated with the related identification information.

12. The information processing apparatus according to claim 11, wherein the information associated with the related identification information comprises at least one of profile information and posted information.

13. The information processing apparatus according to claim 1, wherein the identification information comprises at least one of an account and a telephone number.

14. A determination method comprising:
acquiring positional information associated with at least one piece of related identification information related to each of a plurality of pieces of identification information, each of the pieces of identification information identifying a user in a communication service;
specifying hierarchized positional information indicating positional information hierarchized in accordance with a granularity level of a position based on the positional information, wherein the granularity level is one of a plurality of granularity levels;
calculating a similarity between pieces of identification information using the hierarchized positional information; and
specifying pieces of identification information belonging to one user from among the plurality of pieces of identification information based on the similarity that has been calculated, wherein the method further comprises:
determining, in each identification information, for each of the plurality of granularity levels, importance of a data value pair for each of a plurality of data value pairs included in hierarchized positional information that corresponds to the granularity level and calculating similarities for the respective granularity levels between the pieces of identification information using the importance of the data value pair, and
calculating, for each of the plurality of data value pairs that is common to first identification information and second identification information based on which the similarities for the respective granularity levels between the pieces of identification information are calculated, an evaluation value for the data value pair by multiplying the importance of the data value pair in the first identification information by the importance of the data value pair in the second identification information, and calculating a total sum of the evaluation values for all the data value pairs that are common to the first identification information and the second identification information as the similarity for each of the plurality of granularity levels between the first identification information and the second identification information.

15. A non-transitory computer readable medium storing a program for causing a computer to execute the following processing of:

acquiring positional information associated with at least one piece of related identification information related to each of a plurality of pieces of identification information, each of the pieces of identification information identifying a user in a communication service;

specifying hierarchized positional information indicating positional information hierarchized in accordance with a granularity level of a position based on the positional information, wherein the granularity level is one of a plurality of granularity levels;

calculating a similarity between pieces of identification information using the hierarchized positional information; and specifying pieces of identification information belonging to one user from among the plurality of pieces of identification information based on the similarity that has been calculated, wherein the program further causes the computer to execute the following processing of:

determining, in each identification information, for each of the plurality of granularity levels, importance of a data value pair for each of a plurality of data value pairs included in hierarchized positional information that corresponds to the granularity level and calculating similarities for the respective granularity levels between the pieces of identification information using the importance of the data value pair, and calculating, for each of the plurality of data value pairs that is common to first identification information and second identification information based on which the similarities for the respective granularity levels between the pieces of identification information are calculated, an evaluation value for the data value pair by multiplying the importance of the data value pair in the first identification information by the importance of the data value pair in the second identification information, and calculating a total sum of the evaluation values for all the data value pairs that are common to the first identification information and the second identification information as the similarity for each of the plurality of granularity levels between the first identification information and the second identification information.

* * * * *